US012611939B2

(12) United States Patent
Chen et al.

(10) Patent No.: US 12,611,939 B2
(45) Date of Patent: Apr. 28, 2026

(54) METHOD AND SYSTEM DEVICE FOR MULTIPLE LOAD-BEARING OF LINEAR MOTOR FOR MAGNETIC LEVITATION TRANSPORTATION

(71) Applicant: CRRC ZHUZHOU ELECTRIC LOCOMOTIVE RESEARCH INSTITUTE CO., LTD., Zhuzhou (CN)

(72) Inventors: Gaohua Chen, Zhuzhou (CN); Jianghua Feng, Zhuzhou (CN); Rongjun Ding, Zhuzhou (CN); Yijing Xu, Zhuzhou (CN); Yu Shi, Zhuzhou (CN); Liang Han, Zhuzhou (CN); Yanhui Wen, Zhuzhou (CN); Yonghui Nan, Zhuzhou (CN); Anfeng Zhao, Zhuzhou (CN); Haojiong Lv, Zhuzhou (CN); Kai Fang, Zhuzhou (CN); Huadong Liu, Zhuzhou (CN); Hui Shen, Zhuzhou (CN); Shu Cheng, Zhuzhou (CN); Jungui Su, Zhuzhou (CN); Zhenbang Zhou, Zhuzhou (CN); Cheng Li, Zhuzhou (CN)

(73) Assignee: CRRC ZHUZHOU ELECTRIC LOCOMOTIVE RESEARCH INSTITUTE CO., LTD., Zhuzhou (CN)

( * ) Notice: Subject to any disclaimer, the term of this patent is extended or adjusted under 35 U.S.C. 154(b) by 691 days.

(21) Appl. No.: 17/912,884

(22) PCT Filed: Apr. 16, 2020

(86) PCT No.: PCT/CN2020/085070
§ 371 (c)(1),
(2) Date: Sep. 20, 2022

(87) PCT Pub. No.: WO2021/208002
PCT Pub. Date: Oct. 21, 2021

(65) Prior Publication Data
US 2023/0147692 A1 May 11, 2023

(51) Int. Cl.
| | |
|---|---|
| *B60L 13/03* | (2006.01) |
| *B60L 13/04* | (2006.01) |
| *B60L 53/18* | (2019.01) |
| *B60L 53/20* | (2019.01) |
| *B61B 13/08* | (2006.01) |
| *H02J 50/10* | (2016.01) |

(52) U.S. Cl.
CPC ............... *B60L 13/03* (2013.01); *B60L 13/04* (2013.01); *B60L 53/18* (2019.02); *B60L 53/20* (2019.02);
(Continued)

(58) Field of Classification Search
CPC .......... B60L 13/03; B60L 53/20; B60L 53/18; B60L 13/04; B60L 2240/12; H02J 50/10; B61B 13/08
See application file for complete search history.

(56) References Cited

U.S. PATENT DOCUMENTS 5,839,554 A * 11/1998 Clark ...................... H01F 38/14
191/10
9,862,277 B2 * 1/2018 Dames .................. H01F 27/363
(Continued)

FOREIGN PATENT DOCUMENTS

CN 1056919 A * 12/1991
CN 1426919 A * 7/2003 ............. F42B 12/74
(Continued)

OTHER PUBLICATIONS

International Search Report for PCT/CN2020/085070 mailed Jan. 18, 2021, ISA/CN.

*Primary Examiner* — Jason C Smith
(74) *Attorney, Agent, or Firm* — Yue (Robert) Xu; Apex Attorneys at Law, LLP

(57) ABSTRACT

A method and system device for performing multi-carrying of a linear motor for magnetic levitation transportation is provided. With the method for performing multi-carrying of a linear motor for magnetic levitation transportation, linear
(Continued)

motor traction power information and other linear motor carried information are generated, and the other linear motor carried information is transmitted through a channel for carrying the linear motor traction power information that is constructed based on a linear motor structure.

40 Claims, 29 Drawing Sheets

(52) U.S. Cl.
CPC .............. *B61B 13/08* (2013.01); *H02J 50/10* (2016.02); *B60L 2240/12* (2013.01)

(56) References Cited

U.S. PATENT DOCUMENTS

| | | | | | |
|---|---|---|---|---|---|
| 10,106,046 | B2 * | 10/2018 | Boys | .......................... | H01F 5/00 |
| 10,199,882 | B2 * | 2/2019 | Lannoije | ................. | H02J 50/60 |
| 10,771,033 | B2 * | 9/2020 | Venugopal | ............ | H02M 1/126 |
| 11,652,367 | B2 * | 5/2023 | Boys | ..................... | B60L 53/126 |
| | | | | | 307/104 |
| 2003/0127917 | A1 * | 7/2003 | Kang | ..................... | H02K 41/03 |
| | | | | | 310/12.25 |
| 2015/0311723 | A1 * | 10/2015 | Raedy | ....................... | H02J 5/00 |
| | | | | | 307/104 |
| 2019/0241083 | A1 * | 8/2019 | Wechsler | ................ | B60L 53/38 |
| 2023/0147692 | A1 * | 5/2023 | Chen | ....................... | H02J 50/12 |
| | | | | | 701/19 |

FOREIGN PATENT DOCUMENTS

| | | | | | | |
|---|---|---|---|---|---|---|
| CN | | 102931735 | A | * | 2/2013 | |
| CN | | 105691234 | A | | 6/2016 | |
| CN | | 110549855 | A | * | 12/2019 | ............. B60L 5/005 |
| CN | | 110962634 | A | * | 4/2020 | ............... B60L 1/00 |
| CN | | 110962634 | B | * | 6/2021 | ............... B60L 1/00 |
| CN | | 113580949 | A | * | 11/2021 | |
| GB | | 2497824 | A | * | 6/2013 | ............. B60L 5/005 |
| JP | | S5863001 | A | | 4/1983 | |
| JP | | S5863001 | U | * | 4/1983 | |
| WO | WO-2011016736 | A4 | * | 6/2011 | ............. B60L 5/005 |

* cited by examiner

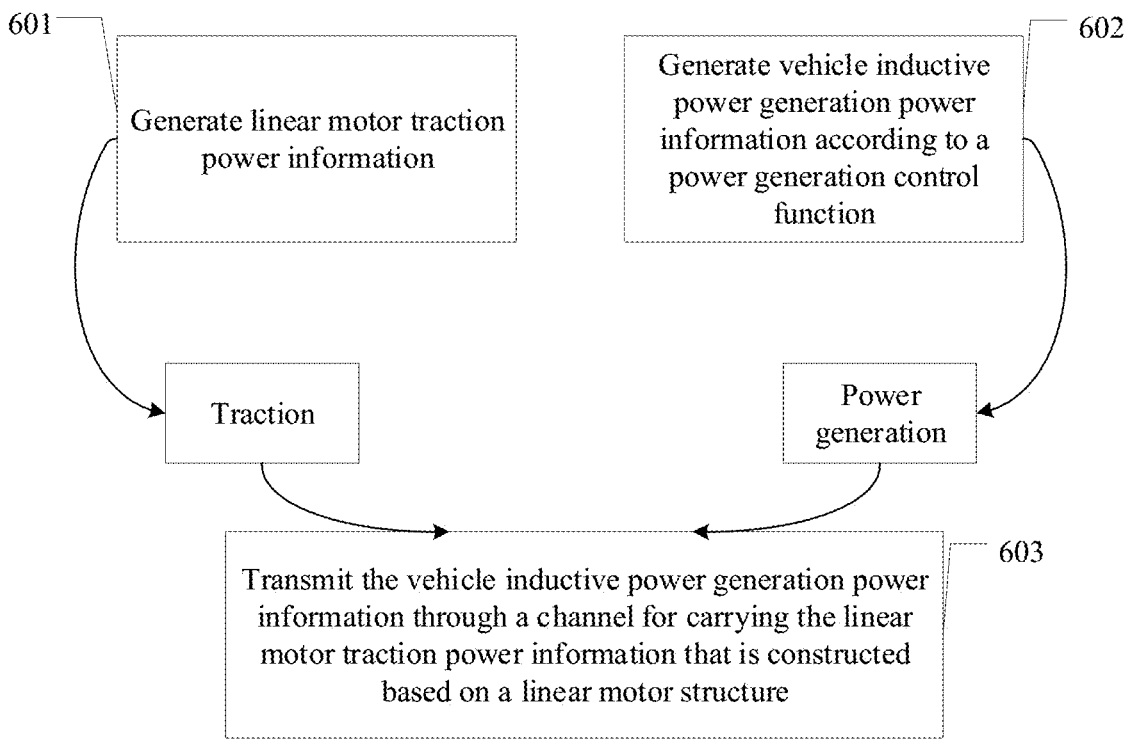

601

Generate linear motor traction power information

602

Generate vehicle inductive power generation power information according to a power generation control function Traction Power generation

603

Transmit the vehicle inductive power generation power information through a channel for carrying the linear motor traction power information that is constructed based on a linear motor structure

Generate linear motor traction power information

1902

Generate a train communication signal according to a communication control function Traction Communication

1903

Transmit the train communication signal through a channel for carrying the linear motor traction power information that is constructed based on a linear motor structure Select two of terminals of U-phase, V-phase, and W-phase of a
signal demodulator as a positive terminal of a single
communication transceiver coil, and select the other terminal as a
common ground terminal

METHOD AND SYSTEM DEVICE FOR MULTIPLE LOAD-BEARING OF LINEAR MOTOR FOR MAGNETIC LEVITATION TRANSPORTATION

This application is the national phase of International Patent Application No. PCT/CN2020/085070, titled "METHOD AND SYSTEM DEVICE FOR MULTIPLE LOAD-BEARING OF LINEAR MOTOR FOR MAGNETIC LEVITATION TRANSPORTATION", filed on Apr. 16, 2020, which is incorporated herein by reference in its entirety.

FIELD

The present application relates to the technical field of magnetic levitation transportation, and in particular to a method and system device for performing multi-carrying of a linear motor for magnetic levitation transportation.

BACKGROUND

Wheel-rail trains have the following technical features: first, the wheel-rail trains are supported and guided with wheels and a track; second, the wheel-rail trains are towed through a rotary motor, and third, the wheel-rail trains are supplied via a catenary and a pantograph.

Conventional magnetic levitation trains, different from the wheel-rail trains, have the following technical features. First, the magnetic levitation trains are no longer supported and guided with wheels. Vertical suspension and lateral guidance are achieved by the interaction between a magnetic pole and a track, and vehicles are suspended in the air during operation. Second, instead of being towed through a rotary motor, the trains are towed through a linear motor, where a stator is arranged on a ground track and the rotor is arranged in the vehicles. Third, instead of being supplied via a catenary and a pantograph, the magnetic levitation trains are supplied via a power rail after being stopped or during a low-speed period. When the magnetic levitation trains travel in a high speed that exceeds a certain speed, power is generated by a power generation coil in a suspended magnetic pole. Compared with a wheel-rail transportation system, a conventional magnetic levitation transportation system has no wheel-rail interaction, no frictional resistance exists between the wheels and the track, and a greater traction power that is not physically limited by wheel-rail adhesion is obtained. There is no derailment coefficient due to the usage of a track-holding magnetic pole guidance or U-shaped magnetic pole track. Therefore, there is no need to worry about a problem regarding the derailment. Without an interaction between the pantograph and the catenary, there is no need to worry about a problem of pantograph detachment and melting of copper wires under a high temperature due to friction. These technological advancements prevent the magnetic levitation trains from many physical constraints of the wheel-rail trains, so that the magnetic levitation trains have technical conditions to reach a higher speed.

However, in linear motor traction technology in an existing technology mode of the magnetic levitation trains, the rotor installed on the vehicles and the stator installed on the ground track are only used to carry vehicle traction power.

SUMMARY

A method and system device for performing multi-carrying of a linear motor for magnetic levitation transportation are provided according to the present disclosure, in which vehicle traction power information and other carried information are carried through an existing linear motor structure.

A method for performing multi-carrying of a linear motor for magnetic levitation transportation is provided according to a first aspect of the present disclosure. The method includes:

generating linear motor traction power information and other linear motor carried information; and transmitting the other linear motor carried information through a channel for carrying the linear motor traction power information that is constructed based on a linear motor structure.

Further, the other linear motor carried information includes vehicle inductive power generation power information and/or a train communication signal, where the generating linear motor traction power information and other linear motor carried information includes:

generating the linear motor traction power information based on a traction demand of the magnetic levitation train;

generating the vehicle inductive power generation power information according to a power generation control function; and/or generating the train communication signal according to a communication control function, where the vehicle inductive power generation power information, the train communication signal and the linear motor traction power information are in frequency bands different from each other.

Further, the generating the vehicle inductive power generation power information according to a power generation control function includes:

calculating an output terminal voltage U according to an output terminal voltage formula of the power generation control function, $$U = \sum_{n=1}^{m} L_n * \frac{di}{dt} + i * \sum_{n=1}^{m} R_n + \hat{U}, L = \sum_{n=1}^{m} L_n$$

where m represents a number of stator sections of the linear motor, L represents a total inductance of the stator sections of the linear motor, $L_n$ represents an inductance of a nth stator section, $1 \leq n \leq m$, $R_n$ represents a resistance of a stator winding of the nth stator section corresponding to the $L_n$, i represents a stator current, and $\hat{U}$ represents a back electromotive force generated by the magnetic levitation train on a stator winding;

calculating an output traction force $F_{traction}(t)$ according to an output traction force formula constructed based on the traction demand of the magnetic levitation train and the power generation control function, $$F_{traction}(t) = A * K_V + B * (1 - K_V)$$

where A and B each represents a parameter related to the stator current i and a vehicle structure of the magnetic levitation train, and $K_v$ represents a speed factor;

calculating an output voltage $U_{generation}$ according to an output voltage formula constructed based on the power generation control function, $$U_{generation} = C * (1 - K_V) + D * V * K_V$$

where C represents a parameter related to the stator current i and the vehicle structure of the magnetic levitation train, D represents a parameter related to the vehicle structure of the magnetic levitation train, and V represents a speed of the magnetic levitation train;

calculating a traction power $f(t)_{traction}$ based on a product of the output traction force $F_{traction}(t)$ and V;

calculating the vehicle inductive power generation power $f(t)_{generation}$ by multiplying the output voltage $U_{generation}$ by the current of the vehicle inductive power generation coil; or calculating the vehicle inductive power generation power $f(t)_{generation}$ by dividing a square of the output voltage $U_{generation}$ by an equivalent resistance of a receiving loop of the vehicle inductive power generation coil, where a normal traction function of the magnetic levitation train is not affected by the vehicle inductive power generation power $f(t)_{generation}$.

Further, the method further includes:

setting a speed threshold of the magnetic levitation train and a weighting coefficient of the speed factor $K_v$ according to a preset control strategy, where the speed threshold is not less than zero and not greater than a maximum speed;

determining the speed factor $K_v$ of a current speed of the magnetic levitation train based on the speed threshold;

determining whether a requirement for cogging power generation is met by comparing the current speed with the speed threshold;

generating power based on the vehicle inductive power generation power information, if the requirement for cogging power generation is not met; and cutting off the power generated based on the vehicle inductive power generation power information and performing cogging power generation, if the requirement for cogging power generation is met.

Further, the generating the train communication signal according to a communication control function includes:

acquiring digital communication information;

obtaining an analog train communication signal by performing a digital-to-analog conversion on the digital communication information through the communication control function, where a normal traction function and a vehicle inductive power generation function of the magnetic levitation train are not affected by the train communication signal.

Further, the transmitting the other linear motor carried information through a channel for carrying the linear motor traction power information that is constructed based on a linear motor structure includes:

inputting the vehicle inductive power generation power information and/or the train communication signal to the stator sections of the linear motor structure in a three-phase manner; and receiving the vehicle inductive power generation power information and/or the train communication signal through the rotor of the linear motor structure or a separate communication transceiver coil.

Further, the transmitting the other linear motor carried information through a channel for carrying the linear motor traction power information that is constructed based on a linear motor structure includes:

inputting the vehicle inductive power generation power information and/or the train communication signal to the stator sections of the linear motor structure in a single-phase manner; and receiving the vehicle inductive power generation power information and/or the train communication signal through the rotor of the linear motor structure or a separate communication transceiver coil.

Further, the transmitting the other linear motor carried information through a channel for carrying the linear motor traction power information that is constructed based on a linear motor structure includes:

inputting the vehicle inductive power generation power information and/or the train communication signal to the stator sections of the linear motor structure in a two-single phase manner; and receiving the vehicle inductive power generation power information and/or the train communication signal through the rotor of the linear motor structure or a separate communication transceiver coil.

A system device for performing multi-carrying of a linear motor for magnetic levitation transportation is provided according to a second aspect of the present disclosure. The system device includes:

a linear motor structure and a converter module matching the linear motor structure, where the linear motor structure includes stator sections arranged on a ground track and a rotor installed on a magnetic levitation train; and the converter module is configured to generate linear motor traction power information and other linear motor carried information, and transmit the other linear motor carried information through a channel for carrying the linear motor traction power information that is constructed based on the linear motor structure.

Further, the other linear motor carried information includes vehicle inductive power generation power information and/or a train communication signal, and the converter module includes:

a traction converter component, configured to generate the linear motor traction power information based on a traction demand of the magnetic levitation train;

a power generation output converter component, configured to generate the vehicle inductive power generation power information according to a power generation control function; and/or a communication converter component, configured to generate the train communication signal according to a communication control function, where the vehicle inductive power generation power information, the train communication signal and the linear motor traction power information are in frequency bands different from each other.

Further, the traction converter component, the power generation output converter component and/or the communication converter component are selected from a three-phase converter, a single-phase converter, or a two-single phase converter.

Further, the rotor of the linear motor structure includes a linear motor rotor and a vehicle inductive power generation coil, where the vehicle inductive power generation coil is configured to generate power generation power by coupling with the vehicle inductive power generation power information of the stator sections of the linear motor structure, the vehicle inductive power generation coil is further configured to: couple with the train communication signal of the stator sections of the linear motor structure and transmit the coupled signal to a signal demodulator, to demodulate the coupled signal by the signal demodulator to obtain the train communication signal; and the vehicle inductive power generation coil is further configured to transmit an in-vehicle signal to the stator sections, and the vehicle inductive power generation coil is further configured to transmit the in-vehicle signal to the stator sections of the linear motor structure.

Further, the system device further includes: a communication transceiver coil, where the rotor of the linear motor structure includes a linear motor rotor and a vehicle inductive power generation coil;

the vehicle inductive power generation coil is configured to generate power generation power by coupling with the vehicle inductive power generation power information of the stator sections of the linear motor structure;

the communication transceiver coil is configured to: couple with the train communication signal of the stator sections of the linear motor structure and transmit the coupled signal to a signal demodulator, to demodulate the coupled signal by the signal demodulator to obtain the train communication signal;

the communication transceiver coil is further configured to transmit an in-vehicle signal to the stator sections of the linear motor structure;

in a case that the communication channel is a single channel, the communication transceiver coil is connected to two of three-phase terminals of the signal demodulator; and in a case that the communication channel is a two-channel, two of the three-phase terminals of the signal demodulator each serves as a positive terminal of a single communication transceiver coil, and the other terminal serves as a common ground terminal.

It can be seen that in the method for performing multi-carrying of a linear motor for magnetic levitation transportation, the channel for carrying the linear motor traction power information can be constructed by using the linear motor structure, and the other linear motor carried information other than the linear motor traction power information can be transmitted through the channel, so that the linear motor structure can be used to not only transmit the vehicle traction power, but also transmit the other linear motor carried information.

BRIEF DESCRIPTION OF THE DRAWINGS

In order to illustrate technical solutions in embodiments according to the present disclosure more clearly, drawings required in the conventional technology and the embodiments are briefly introduced hereafter. Apparently, the drawings in the following description only show some embodiments of the present disclosure. For those skilled in the art, other drawings may be obtained according to these drawings without any creative effort.

FIG. 1-2 is a schematic flowchart of a method for performing multi-carrying of a linear motor for magnetic levitation transportation according to an embodiment of the present disclosure;

FIG. 2 is a schematic structural diagram of an existing in-vehicle power generation and power supply scheme;

FIG. 6 is a schematic flowchart of a method for performing multi-carrying of a linear motor for magnetic levitation transportation according to another embodiment of the present disclosure;

DETAILED DESCRIPTION OF THE EMBODIMENTS

The core concept of the present disclosure is to provide a method and a system device for performing multi-carrying of a linear motor for magnetic levitation transportation, in which vehicle traction power and other carried information are carried through an existing linear motor structure.

In order to make the purposes, technical solutions and advantages of embodiments according to the present disclosure clearer, technical solutions in the embodiments according to the present disclosure will be clearly and completely described hereinafter with reference to the drawings in the embodiments according to the present disclosure. Apparently, the described embodiments are some embodiments, rather than all embodiments, of the present disclosure. Based on the embodiments of the present disclosure, all other embodiments obtained by those of ordinary skill in the art without creative efforts shall fall within the protection scope of the present disclosure.

The present disclosure is mainly applied to the field of magnetic levitation transportation. In the background part, linear motor traction technology of magnetic levitation train technology is discussed. However, rotor installed on vehicles and stator sections installed on a ground track of existing magnetic levitation trains are only used for carrying vehicle traction power.

Figure 1:
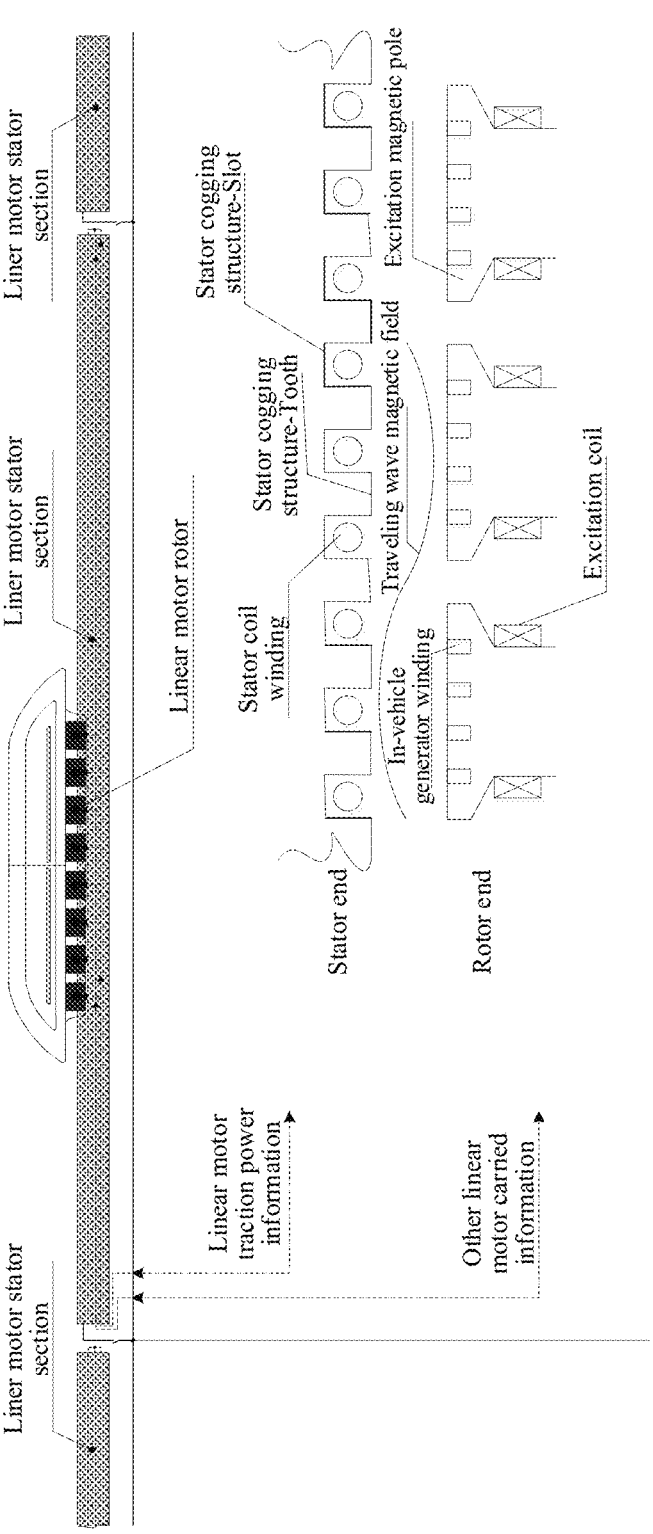
FIG. 1-1 is an architecture diagram of a system for performing multi-carrying of a linear motor for magnetic levitation transportation according to the present disclosure.
Figures 1, 2:
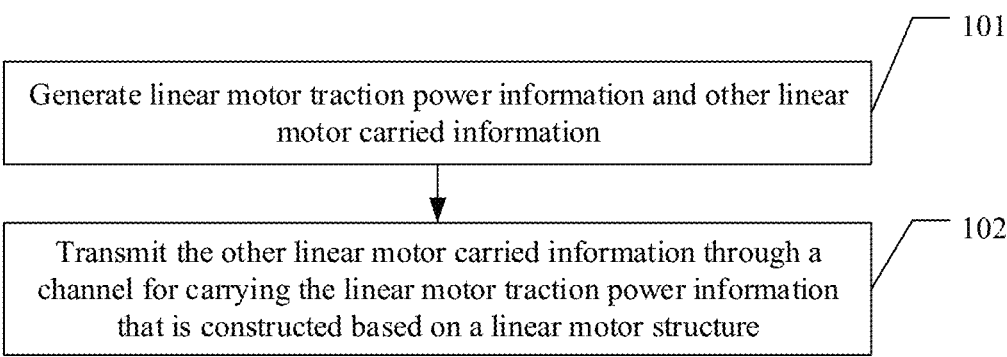
Figure 2:
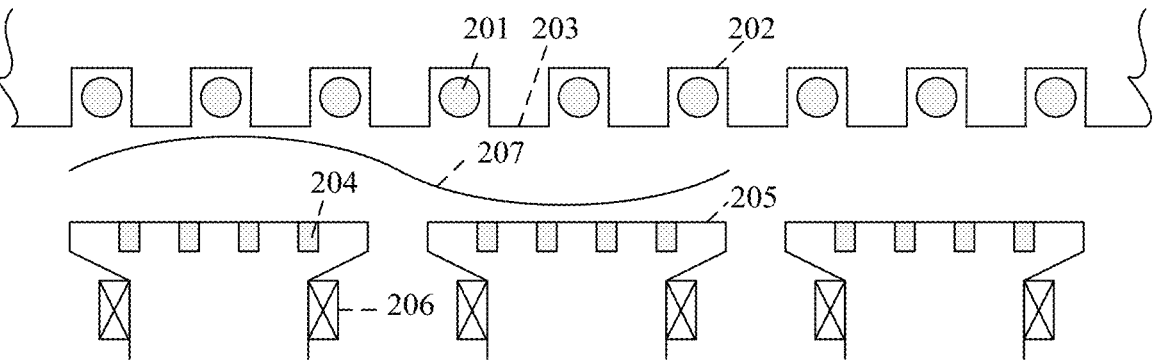

In combination with an architecture diagram of a system for performing multi-carrying of a linear motor for magnetic levitation transportation as shown in FIG. 1-1, where existing technology and structure are used by the linear motor of a magnetic levitation train in FIG. 1-1, as shown in FIG. 1-2, a method for performing multi-carrying of a linear motor for magnetic levitation transportation is provided according to an embodiment of the present disclosure. The method includes steps 101 to 102.

In step 101, linear motor traction power information and other linear motor carried information are generated.

In the present embodiment, the linear motor traction power information is generated based on a traction demand of a magnetic levitation train according to the conventional technology. The other linear motor carried information is information other than the traction power information, which may be power generation power, a train communication signal, or the like in the present disclosure.

In step 102, the other linear motor carried information is transmitted through a channel for carrying the linear motor traction power information that is constructed based on a linear motor structure.

In the present embodiment, an existing solution is adopted for the linear motor structure, that is, a linear motor stator is arranged on the ground track, and a linear motor rotor is arranged on the magnetic levitation train, to construct a channel for carrying the linear motor traction power. In the present disclosure, with the existing linear motor structure, the other linear motor carried information may further be transmitted through the constructed channel for carrying the traction power of the linear motor. For example, in a case that the other linear motor carried information is vehicle inductive power generation power information, the power generation of the vehicle can be realized. In a case that the other linear motor carried information is a train communication signal, communication between the vehicle and the ground can be realized.

In the embodiments shown in FIGS. 1-1 and 1-2, the other linear motor carried information is added for the following technical difficulties required to be overcome in the existing technology of the magnetic levitation train.

1. The Manner in which the Vehicle is Supplied

In the current manner in which the vehicle is supplied, it is required to lay power rails in possible parking areas. In other words, the train can only park in predetermined parking areas, which limits the ability of the train to respond to emergencies, especially natural disasters arising suddenly on the line. As shown in FIG. 2, 201 denotes a coil winding of a stator, 202 denotes a slot in a cogging structure of the stator, 203 denotes a tooth in the cogging structure of the stator, 204 denotes an in-vehicle generator winding, 205 denotes an excitation magnetic pole, 206 denotes an excitation coil, and 207 denotes traveling wave magnetic field.

In an existing power supply scheme 1, a vehicle is supplied by contacting a power rail with a current receiving shoe in a case that the vehicle is stopped or travels at a low speed, and is supplied by cogging power generation (non-contact) in a case that the vehicle is traveling at a medium speed or a high speed. Specifically, in a case that the vehicle is stopped or is decelerated to be at a low speed, the vehicle is supplied by contacting the power rail next to the line and the current receiving shoe of the vehicle. When the speed is higher than a certain speed, the vehicle is supplied by cutting magnetic field lines of the traveling wave magnetic field by an inductive power generation coil attached to the rotor (also called a mover, mainly a suspended magnetic pole) of the linear motor on the vehicle, to generate electric energy according to the principle of electromagnetic induction. The above scheme requires sufficient power rails provided in station areas and temporary parking areas and the vehicle is provided with the current receiving shoe.

Figure 3:
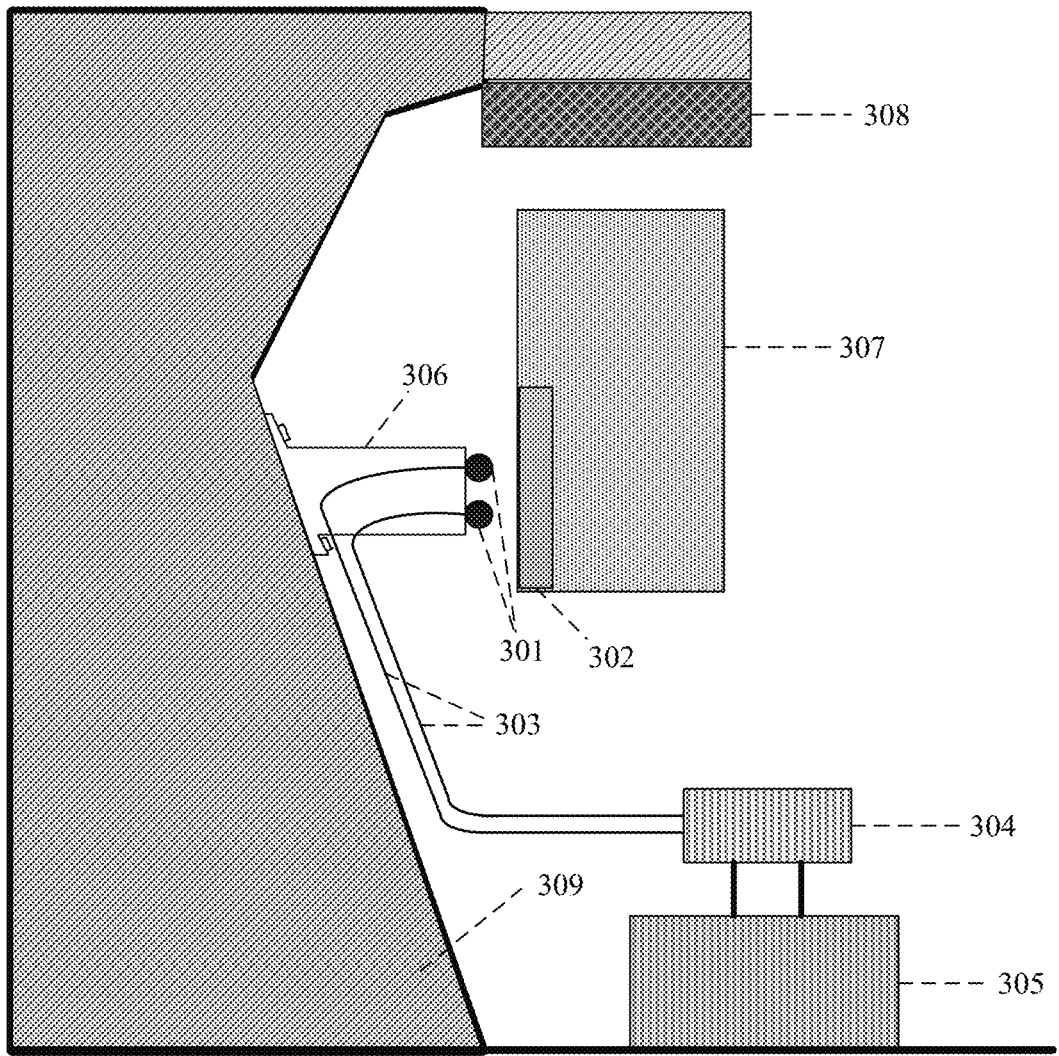
FIG. 3 is a schematic structural diagram of an existing non-contact power supply scheme.

In the existing power supply scheme 2, a vehicle is supplied in a non-contact manner by a set of inductive coils and converter devices in a case that the vehicle is stopped or travels at a low speed, and the existing scheme 1 is stilled utilized when the train is traveling at the medium speed and the high speed. Specifically, a non-contact power supply scheme as shown in FIG. 3 is provided in a case that the vehicle is stopped or travels at a low speed. In FIG. 3, 301 denotes a primary-side transmitting coil of an inductive coil, 302 denotes an in-vehicle secondary-side receiving coil of the inductive coil, 303 denotes a high frequency cable, 304 denotes a power conversion module, 305 denotes a converter device, 306 denotes an installation base of a primary end of the inductive coil, 307 denotes a suspended magnetic pole module, 308 denotes a synchronous linear motor stator module, 309 denotes a track infrastructure, where the power rail next to the line and the current receiving shoe on the vehicle in the scheme 1 are cancelled, the inductive coil is arranged on the vehicle, and the inductive coil and supporting equipment such as the converter for supplying the inductive coil are arranged on the line having a considerable length in the station areas and the temporary parking areas. In a case that the vehicle is stopped, or the vehicle is at a low-speed, the converter and the inductive coil on the line provide non-contact power supply to the inductive coil on the vehicle. When the speed is higher than a certain speed, the existing scheme 1 is still utilized for the medium speed and the high-speed.

However, the scheme 1 has the following disadvantages: the vehicle can only be stopped at the station areas or the temporary parking areas, and a wind resistance of the vehicle is increased by the current receiving shoe when the vehicle travels at a high speed, which leads to a high cost for the line. The scheme 2 has the following disadvantages: there are many devices in the ground system, and a receiving coil and supporting equipment are required to be added for the vehicle, which increases a bearing load of the vehicle. In addition, the system is complex, and the line has a high cost. These components are only laid in the station areas and the temporary parking areas, rather that in the whole line. The vehicle can only be parked in the station areas or the temporary parking areas.

2. Train-Ground Communication

Figure 4:
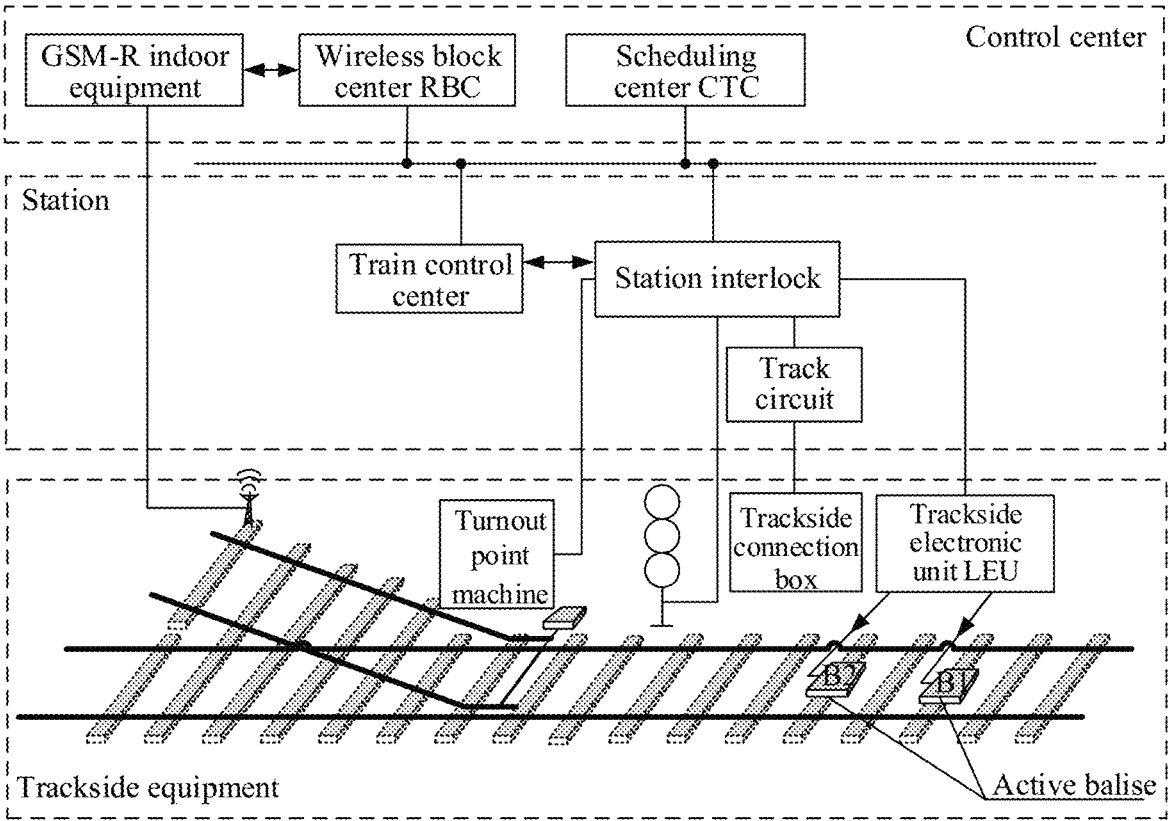
FIG. 4 is a diagram of an existing architecture for train-ground communication for controlling a high-speed magnetic levitation train.
Figure 5:
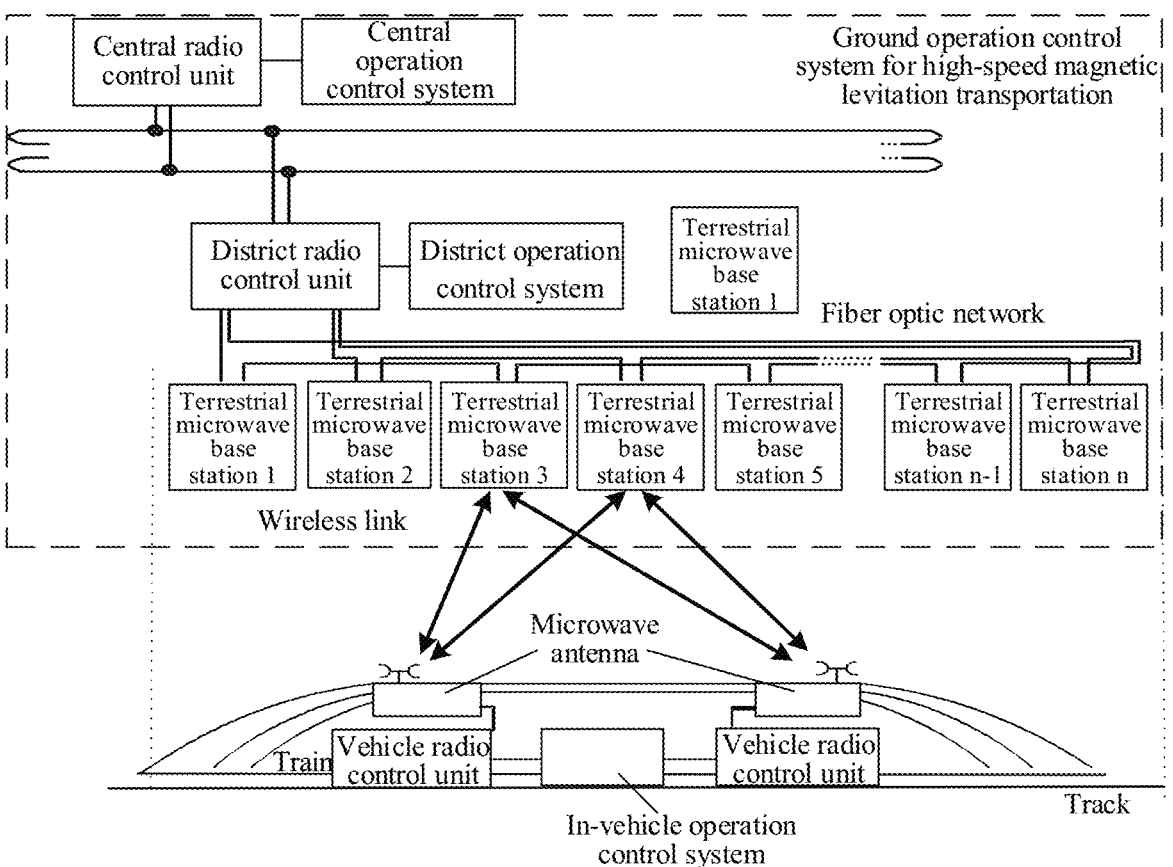
FIG. 5 is a diagram of a conventional architecture for train-ground communication for controlling a mass transit train.

In an existing train-ground communication scheme, an architecture for train-ground communication for controlling high-speed magnetic levitation train is as shown in FIG. 4. The architecture has the following disadvantages: the train is controlled completely relying on the system for train-ground communication, and independent backup communication is not provided. FIG. 5 shows an architecture for train-ground communication for controlling a traditional rail transit train. There is a set of signals for controlling a track circuit as backup. When wireless communication fails, the signals for controlling the track circuit support the train to continually travels at a degraded speed. When the signals for controlling the track circuit are also unavailable at the same time, the driver may visually control the train to travel at a slow speed under a manual dispatch command. In the current high-speed magnetic levitation transportation system, the train is completely suspended in the air when traveling, microwave communication is utilized for the train-ground communication, and the microwave communication has channel redundancy. The disadvantage is that the magnetic levitation transportation system completely relies on the microwave communication between the train and the ground, and there is no independent backup communication. Once all of channels for microwave communication fail, the train cannot travel continually and can only be stopped.

In order to solve problems of power supply and communication in the above two aspects in the conventional technology, the other linear motor carried information mainly includes the vehicle inductive power generation power information and/or the train communication signal in the present disclosure. It should be noted that, in an implementation, the other carried information is not only limited to the vehicle inductive power generation power information and/or the train communication signal, but may also include other types of information, which is not specifically limited.

The embodiments of the present disclosure are described in the following three situations: I. the other linear motor carried information is the vehicle inductive power generation power information; II. the other linear motor carried information is the train communication signal; and III. the other linear motor carried information includes the vehicle inductive power generation power information and the train communication signal.

Hereinafter, the three situations I, II and III are described by using a method in combination with a system device in specific embodiments.

I. The other linear motor carried information is the vehicle inductive power generation power information.

Based on the existing theory, as long as there is an alternating current on the stator sections of the linear motor on the ground, and there is a relative velocity in an electromagnetic space between the stator sections and the inductive power generation coil on the rotor of the linear motor of a moving vehicle, an alternating current is induced by the inductive power generation coil attached to the rotor of the linear motor of the vehicle, and the vehicle may be supplied in an inductive manner. However, in actual situations, when the vehicle is in a stopped state, the stator sections of the linear motor on the ground have no traction voltage, current and power, and the inductive power generation coil on the rotor of the linear motor of the vehicle has no inductive voltage, current and power. When the train is started up or travels at a low speed, the frequency and amplitude of the current applied to the stator sections of the liner motor on the ground are not enough for the inductive power generation coil attached to the rotor of the linear motor of the vehicle to induce a sufficiently high and usable alternating voltage, current and power. Such sufficiently high voltage, current and power are referred to as thresholds. The thresholds correspond to a threshold of the speed for the inductive power generation. That is, when the speed is higher than the speed threshold, enough electric energy may be induced by the inductive power generation coil.

The above principle is based on a premise that, according to Faraday's law of electromagnetic induction, power can be generated in an inductive manner in a case that there is a relative velocity in an electromagnetic space between the electromagnetic field of the stator sections of the linear motor and the inductive power generation coil attached to the rotor of the linear motor, to generate. The existing magnetic levitation transportation system uses a synchronous linear motor. In fact, a space velocity of the magnetic field of the inductive power generation coil attached to the rotor of the linear motor on the vehicle is equal to the speed of a fundamental wave of the stator of the linear motor. The inductive power generation coil attached to the rotor of the linear motor on the vehicle obtains a power generation voltage by inducing variation of the electromagnetic field in the cogging structure of the stator of the linear motor. The frequency of the electromagnetic field of the inductive power generation coil is several times the fundamental frequency of the stator of the linear motor. Therefore, there is always a speed difference of several times between the electromagnetic field of the inductive power generation coil and the stator of the linear motor, which provides a necessary basis for the inductive power generation coil attached to the rotor of the linear motor on the vehicle to generate power. The above method is referred to as cogging power generation. However, the cogging power generation is still only suitable for higher speeds. Because when the speed is low, the electromagnetic field in the cogging structure has a small amplitude and small variation, the inductive power generation coil cuts the magnetic field line at a low speed, and the induced voltage, current and power on the inductive power generation coil cannot meet needs of the vehicle. When the vehicle is stopped, the cogging power generation has a quantity of zero.

Therefore, the problem to be solved by the present disclosure is that if the inductive power generation coil is capable of obtaining a voltage higher than a voltage threshold in a case that the vehicle is stopped or at a low speed, that is, when the speed is lower than a speed threshold, the magnetic levitation train can be supplied on the entire line. In this way, the train can be stopped at any position on the line, original restrictions in parking in specific areas is removed, the power rail next to the line and the current receiving shoe on the vehicle are canceled, and a last friction part is canceled, which greatly reduces construction costs and maintenance costs and reduces the wind resistance and the weight of the vehicle.

Based on the above, as shown in FIG. 6, a method for performing multi-carrying of a linear motor for magnetic levitation transportation is provided according to an embodiment of the present disclosure. The method includes steps 601 to 603.

In step 601, linear motor traction power information is generated based on a traction demand of a magnetic levitation train.

Figure 7:
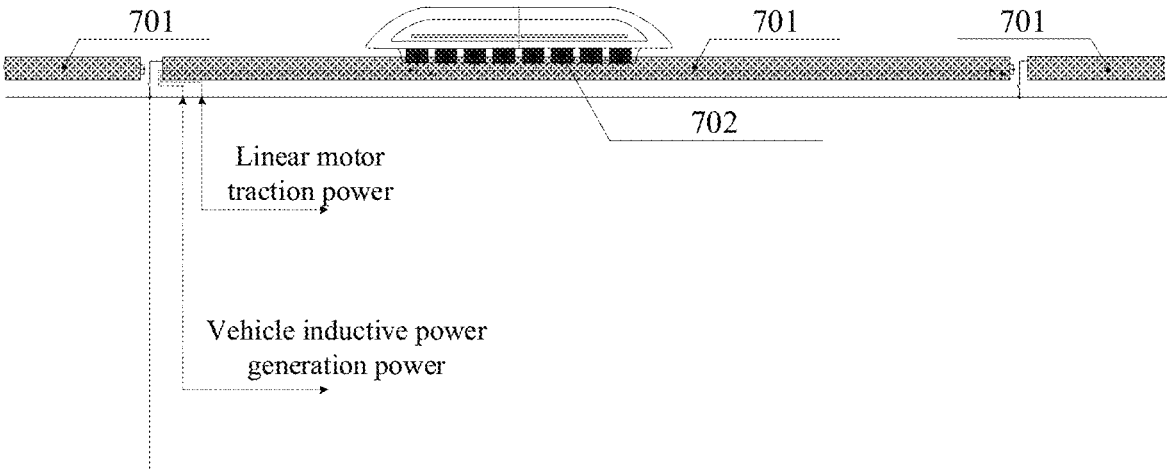
FIG. 7 is another architecture diagram of a system for performing multi-carrying of a linear motor for magnetic levitation transportation according to the present disclosure.

In the present embodiment, as shown in FIG. 7, the existing linear motor structure includes linear motor stator sections 701 installed on the ground track and a linear motor rotor 702 installed on the magnetic levitation train. The linear motor traction power information uses an existing traction converter component. The traction converter component may be a traction converter. A three-phase converter is used in practice. A linear motor traction power is inputted in a three-phase manner to three-phase terminals of the linear motor stator sections. The traction power information is generated based on the traction demand of the magnetic levitation train.

In step 602, vehicle inductive power generation power information is generated according to a power generation control function.

In the present embodiment, the vehicle inductive power generation power information is generally generated through a power generation output converter component. The power generation output converter component may be a power generation output converter, and the power generation output converter may be in a three-phase, a single-phase or a two-single phase. The calculation according to the power generation control function is implemented as follows:

calculating an output terminal voltage U according to an output terminal voltage formula of the power generation control function, $$U = \sum_{n=1}^{m} L_n * \frac{di}{dt} + i * \sum_{n=1}^{m} R_n + \hat{U}, L = \sum_{n=1}^{m} L_n$$

where m represents a number of stator sections of the linear motor, L represents a total inductance of the stator sections of the linear motor, $L_n$ represents an inductance of a nth stator section, $1 \leq n \leq m$, $R_n$ represents a resistance of a stator winding of the nth stator section corresponding to the $L_n$, i represents a stator current, and $\hat{U}$ represents a back electromotive force generated by the magnetic levitation train on a stator winding;

calculating an output traction force $F_{traction}(t)$ according to an output traction force formula constructed based on the traction demand of the magnetic levitation train and the power generation control function, $$F_{traction}(t) = A * K_V + B * (1 - K_V)$$

where A and B each represents a parameter related to the stator current i and a vehicle structure of the magnetic levitation train, and $K_v$ represents a speed factor;

generating an output voltage $U_{generation}$ according to an output voltage formula constructed based on the power generation control function, $$U_{generation} = C * (1 - K_V) + D * V * K_V$$

where C represents a parameter related to the stator current i and the vehicle structure of the magnetic levitation train, D represents a parameter related to the vehicle structure of the magnetic levitation train, and V represents a speed of the magnetic levitation train;

calculating a traction power $f(t)_{traction}$ based on a product of the output traction force $F_{traction}(t)$ and V;

calculating the vehicle inductive power generation power $f(t)_{generation}$ by multiplying the output voltage $U_{generation}$ by the current of the vehicle inductive power generation coil; or calculating the vehicle inductive power generation power $f(t)_{generation}$ is calculated by dividing a square of the output voltage $U_{generation}$ by an equivalent resistance of a receiving loop of the vehicle inductive power generation coil, where a normal traction function of the magnetic levitation train is not affected by the vehicle inductive power generation power $f(t)_{generation}$ and the vehicle inductive power generation power $f(t)_{generation}$ serves as the vehicle inductive power generation power information.

The vehicle inductive power generation power information and the linear motor traction power information are in frequency bands different from each other. Thus, when the vehicle generates power in an inductive manner, neither a magnetic field that causes the vehicle to travel nor a magnetic field that causes the vehicle to vibrate is formed, so that a normal traction function of the magnetic levitation train is not be affected.

On the basis of the above power generation control function, the speed factor $K_v$ is set in a following rule:

setting a speed threshold $V_0$ of the magnetic levitation train and a weighting coefficient K of the speed factor $K_v$ according to a preset control strategy, where the speed threshold $V_0$ is not less than zero and not greater than a maximum speed $V_{max}$, and the expression is represented as $$V_o \in [0, V_{max}], K \in [0, 1];$$

determining the speed factor $K_v$ of a current speed V of the magnetic levitation train based on the speed threshold $V_0$, where the weighting coefficient K may be set as any value greater than 0;

determining whether a requirement for cogging power generation is met by comparing the current speed V with the speed threshold $V_0$, where the speed factor $K_v$ equaling to K means that the current speed V is greater than the speed threshold $V_0$, and the requirement for cogging power generation is met, the speed factor $K_v$ equaling to 0 means that the current speed V is less than the speed threshold $V_0$, and the requirement for cogging power generation is not met;

if the requirement for cogging power generation is not met, generating power based on the vehicle inductive power generation power information, that is, the vehicle inductive power generation is performed by coupling of the inductive power generation coil attached to the rotor and the stator sections; and if the requirement for cogging power generation is met, cutting off the power generated based on the vehicle inductive power generation power information, and performing cogging power generation.

In step 603, the vehicle inductive power generation power information is transmitted through a channel for carrying the linear motor traction power information that is constructed based on a linear motor structure.

In the present embodiment, the existing linear motor structure shown in FIG. 7 is utilized, that is, the linear motor stator sections 701 installed on the ground track, and the linear motor rotor 702 installed on the magnetic levitation train are utilized. In the practical application of the present disclosure, if an inductive power generation coil is attached to the rotor 702, there is no need to add an inductive power generation coil. If there is no inductive power generation coil in the rotor 702, an inductive power generation coil is attached to the rotor 702. In this way, a channel for carrying the linear motor traction power information and the vehicle inductive power generation power information is constructed on the basis of the existing linear motor structure. The vehicle inductive power generation power information is transmitted by the existing channel for carrying the linear motor traction power information. In an implementation, a function that meets certain conditions may be expressed as a trigonometric function (a sine function or a cosine function) or a linear combination of integrals of the sine function or the cosine function by using Fourier transform. The expression is generally as follows.

$$f(t) = c_0 + \sum_{i=1}^{+\infty} c_n * \cos(n * \omega_0 * t)$$

Essentially, the linear motor structure serves as a common transmission channel for the voltage, current and power used for vehicle traction, and the voltage, current and power used for vehicle power generation. That is, the traction power information and the vehicle power generation power information are multi-carried by the linear motor structure. The output of the linear motor structure is constituted as follows:

$$f(t)_{all} = f(t)_{traction} + f(t)_{generation}$$

where $f(t)_{all}$ represents all the information carried by the linear motor structure, $f(t)_{traction}$ represents the traction power of the linear motor, and $f(t)_{generation}$ represents the vehicle inductive power generation power.

As can be known from the above, compared with the schemes 1 and 2 in the conventional technology, the inductive power generation coil attached to the rotor is capable of obtaining a voltage higher than a voltage threshold even when the vehicle is stopped or at a low speed, that is, when the speed is lower than a speed threshold, so that the magnetic levitation train can be supplied with power on the entire line. In this way, the train can be stopped at any position on the line, original restrictions in parking in specific areas is removed, the power rail next to the line and the current receiving shoe on the vehicle are canceled, and a last friction part is canceled, which greatly reduces construction costs and maintenance costs, and reduces the wind resistance and the weight of the vehicle.

In the above embodiment shown in FIG. 6, only the principle of transmitting the vehicle inductive power generation power information through the channel for carrying the traction power of the linear motor structure is described, and how the linear motor structure carries the information is not specifically described. The transmission of the other linear motor carried information through the channel for carrying in the step 603 is described hereinafter.

The channel for carrying of the linear motor structure carries the vehicle inductive power generation power information in three manners of three-phase, single-phase and two-single phase, which are described in detail as follows.

(1) The vehicle inductive power generation power information is inputted to the stator sections of the linear motor structure in a three-phase manner, and the vehicle inductive power generation power information is received through the rotor of the linear motor structure.

The three-phase manner includes the following connection manners.

Figure 8:
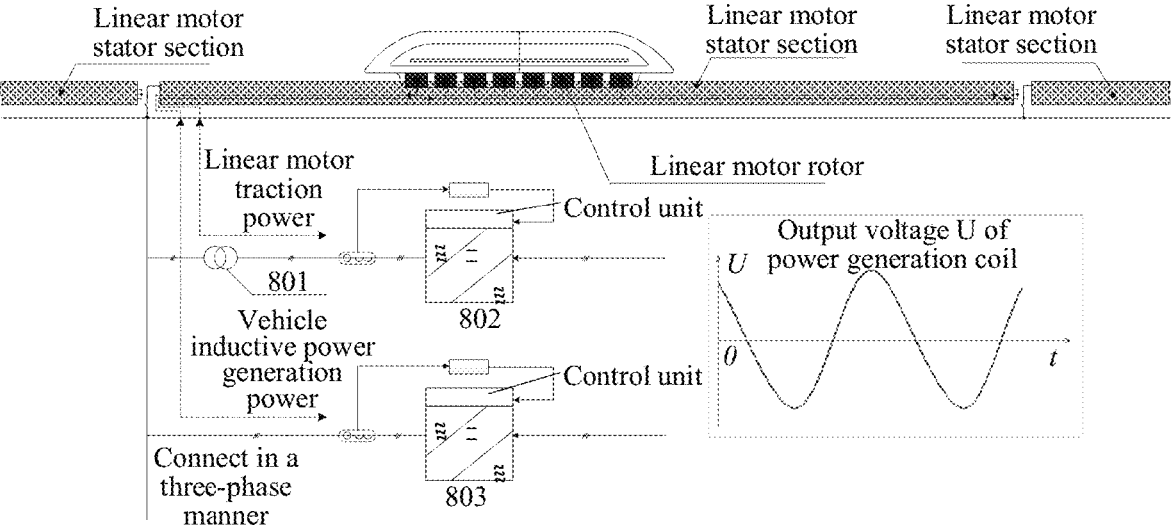
FIGS. 8 to 18 are architecture diagrams of a system for performing multi-carrying of a linear motor for magnetic levitation transportation according to the present disclosure.

(1.1). As shown in FIG. 8, a traction converter component 802 outputs a linear motor traction power, and a power generation output converter component 803 outputs a vehicle inductive power generation power. It should be noted that, in FIG. 8, the traction converter component 802 and the power generation output converter component 803 are embodied as converters, and are three-phase converters. In practice, the traction converter component 802 and the power generation output converter component 803 may also be in other forms, as long as they have an input terminal and a processor having a power generation control function, an output terminal and a feedback structure connected with the output terminal. The feedback structure is used to dynamically adjust the output power and information of the output terminal. Before the traction converter component 802 is connected to the stator sections of the linear motor, it is required to perform voltage transformation through an independent traction transformer component 801, so as to protect the entire linear motor structure. It should be noted that, the voltage transformation is implemented as adjusting the voltage based on actual requirements, which may be increasing or decreasing the voltage. The output terminal of a power generation output converter component 1003 is directly connected to the stator sections of the linear motor structure in a three-phase manner, and is coupled with the vehicle inductive power generation coil attached to the rotor of the linear motor structure, to receive the vehicle inductive power generation power. The vehicle inductive power generation power is transmitted to a vehicle power storage device or directly used by devices, to supply power to the magnetic levitation train.

Figure 9:
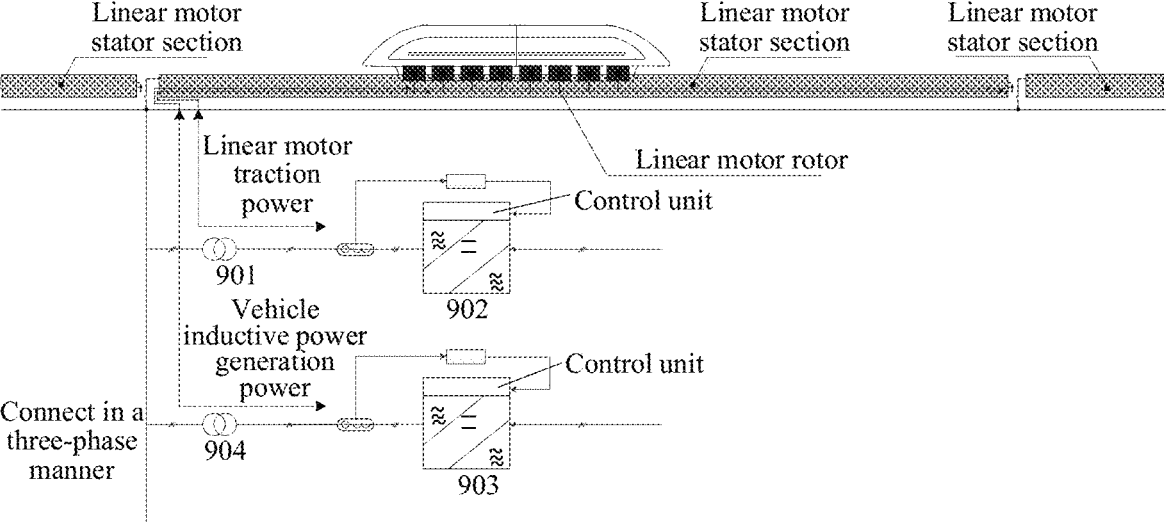

(1.2). As shown in FIG. 9, the description of an independent traction transformer component 901, a traction converter component 902, and a power generation output converter component 903 is the same as that in (1.1). However, before the power generation output converter component 903 is connected to the stator sections of the linear motor structure, it is required to add an independent power generation transformer component 904. The independent power generation transformer component 904 can perform transformation on the vehicle inductive power generation power, to protect the linear motor structure.

Figure 10:
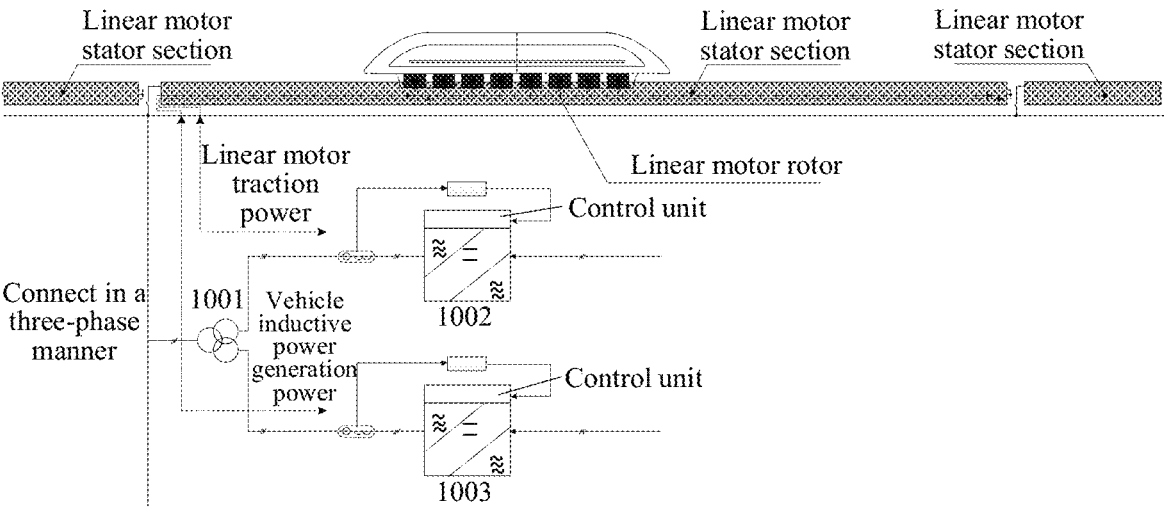

(1.3). As shown in FIG. 10, the description of a traction converter component 1002 and a power generation output converter component 1003 is the same as that in (1.1). However, before the power generation output converter component 1003 and the traction converter component 1002 is connected to the stator sections of the linear motor structure, it is required to add an independent primary winding transformer component 1001. The traction transformer component 1002 and the power generation output converter component 1003 are connected to a primary side of the independent primary winding transformer component 1201, and a secondary side of the independent primary winding transformer component 1001 is connected to the stator sections of the linear motor structure.

(2) The vehicle inductive power generation power information is inputted to the stator sections of the linear motor structure in a single-phase manner, and the vehicle inductive power generation power information is received through the rotor of the linear motor structure.

The single-phase manner includes the following connection manners.

Figure 11:
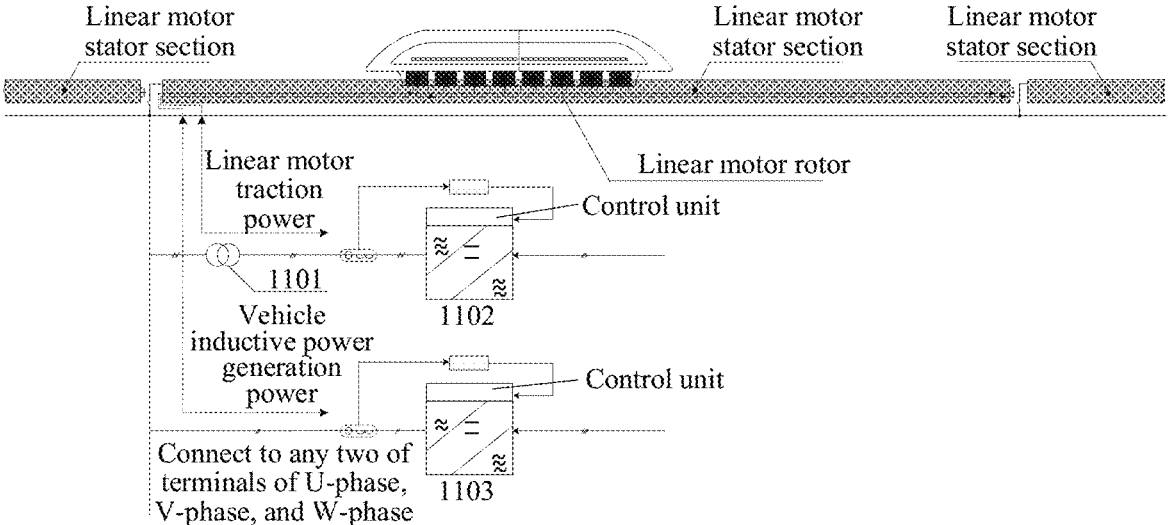

(2.1). As shown in FIG. 11, a traction converter component 1102 outputs a linear motor traction power, and a power generation output converter component 1103 outputs the vehicle inductive power generation power. It should be noted that in FIG. 11, the traction converter component 1102 and the power generation output converter component 1103 are embodied as converters, where the traction converter component 1102 is a three-phase converter, and the power generation output converter component 1103 is a single-phase converter. In practice, the traction converter component 1102 and the power generation output converter component 1103 may also be in other forms, as long as they have an input terminal and a processor having a power generation control function, an output terminal and a feedback structure connected with the output terminal. The feedback structure is used to dynamically adjust the output power and information of the output terminal. Before the traction converter component 1102 is connected to the linear motor stator sections, it is required to perform voltage transformation through an independent traction transformer component 1101. The output terminal of the power generation output converter component 1103 is directly connected to two of three-phase terminals of the stator sections of the linear motor structure in a single-phase manner, that is, any two terminals are selected from three terminals of U-phase, V-phase, and W-phase to be connected. Through the coupling of the vehicle inductive power generation coil attached to the rotor of the linear motor structure, the vehicle inductive power generation power may be received. The vehicle inductive power generation power may be transmitted to a vehicle power storage device, to realize power generation of the magnetic levitation train.

Figure 12:
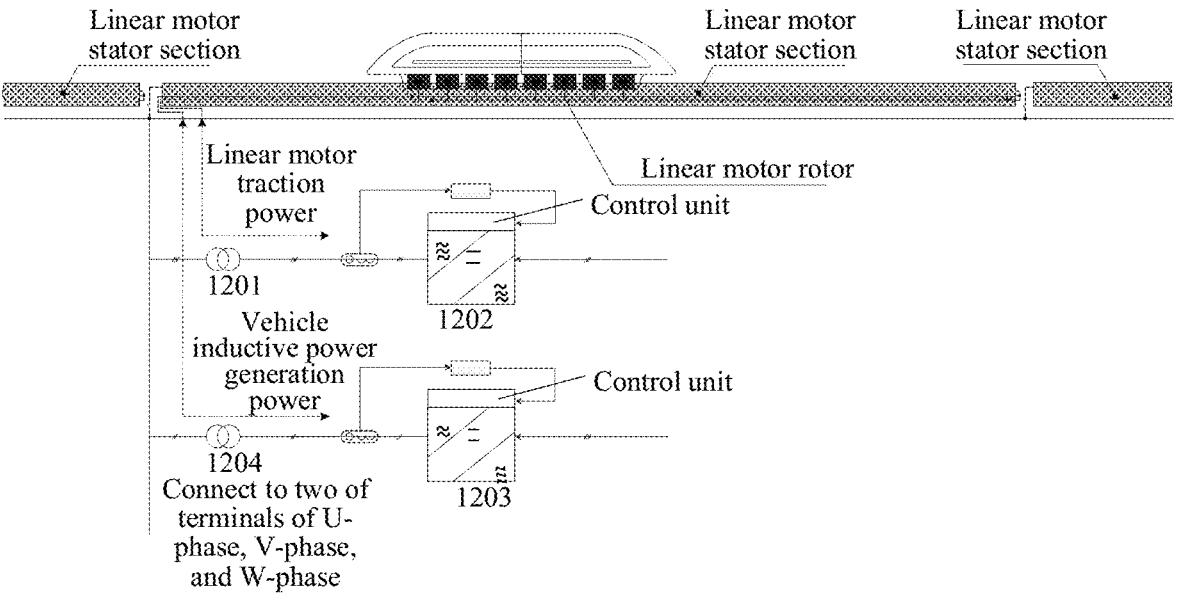

(2.2). As shown in FIG. 12, the description of an independent traction transformer component 1201, a traction converter component 1202, and a power generation output converter component 1203 is the same as that in (2.1). However, before the power generation output converter component 1203 is connected to the stator sections of the linear motor structure, it is required to add an independent power generation transformer component 1204. The independent power generation transformer component 1204 can perform transformation on the vehicle inductive power generation power.

Figure 13:
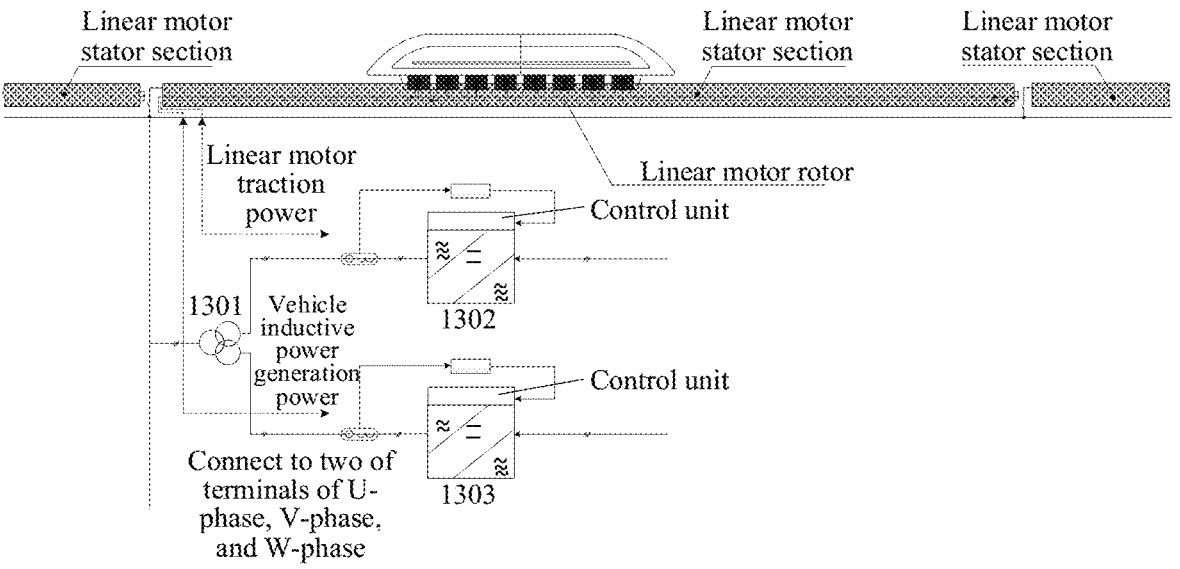

(2.3). As shown in FIG. 13, the description of a traction converter component 1302 and a power generation output converter component 1303 is the same as that in (2.1). However, before the power generation output converter component 1303 and the traction converter component 1302 are connected to the stator sections of the linear motor structure, it is required to add an independent primary winding transformer component 1301. The traction converter component 1302 and the power generation output converter component 1303 are connected to a primary side of the independent primary winding transformer component 1301, and a secondary side of the independent primary winding transformer component 1301 is connected to the stator sections of the linear motor structure.

(3) The vehicle inductive power generation power information is inputted to the stator sections of the linear motor structure in a two-single phase manner, and the vehicle inductive power generation power information is received through the rotor of the linear motor structure.

The two-single phase manner includes the following connection manners.

Figure 14:
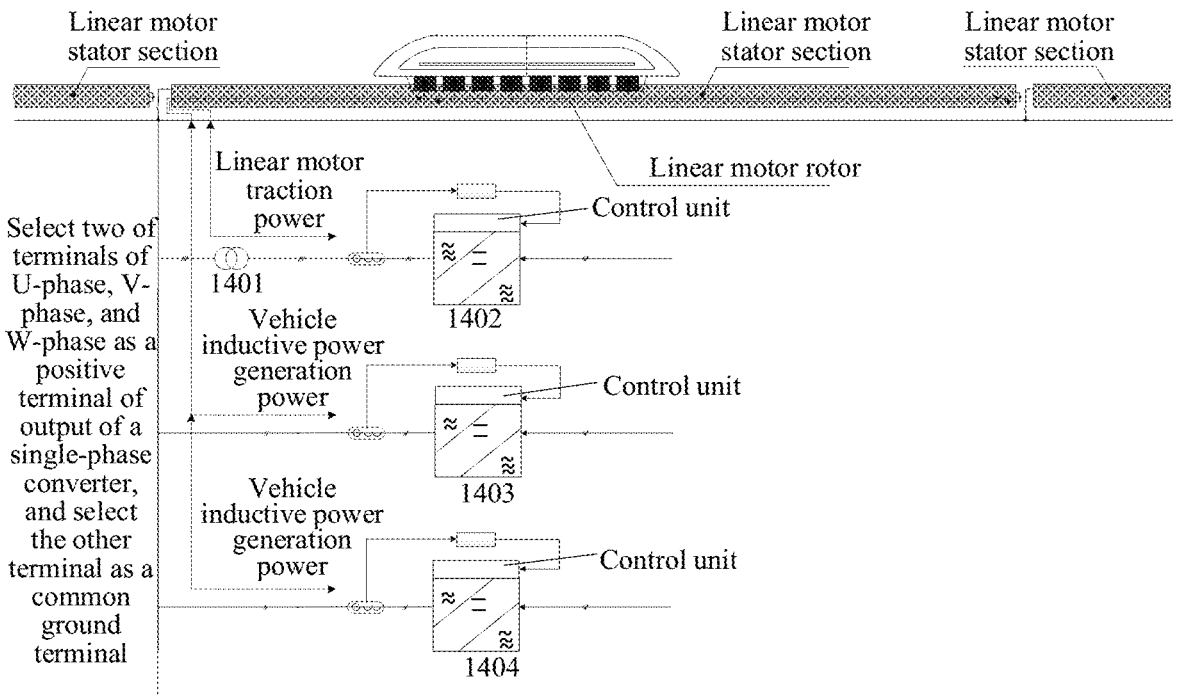

(3.1). As shown in FIG. 14, a traction converter component 1402 outputs a linear motor traction power. Since a power generation output converter component is in double single-phase, there are two power generation output converter components, that is, a power generation output converter component 1403 and a power generation output converter component 1404, which output the vehicle inductive power generation power. It should be noted that in FIG. 14, the traction converter component 1402, the power generation output converter component 1403 and the power generation output converter component 1404 are embodied as converters, where the traction converter component 1402 is a three-phase converter, and the power generation output converter component 1403 and the power generation output converter component 1404 are two-single phase converters. In practice, the traction converter component 1402, the power generation output converter component 1403 and the power generation output converter component 1404 may also be in other forms, as long as they have an input terminal and a processor having a power generation control function, an output terminal and a feedback structure connected with the output terminal. The feedback structure is used to dynamically adjust the output power and information of the output terminal. Before the traction converter component 1402 is connected to the stator sections of the linear motor, it is required to perform voltage transformation through an independent traction transformer component 1401. The power generation output converter component 1403 and the power generation output converter component 1404 select one of three terminals of U-phase, V-phase and W-phase as a common ground terminal, and the other two terminals are positive terminals for connecting to the outputs of the two power generation output converter components 1403 and 1404. Through the coupling of the vehicle inductive power generation coil attached to the rotor of the linear motor structure, the vehicle inductive power generation power may be received. The vehicle inductive power generation power may be transmitted to a vehicle power storage device, to realize power generation of the magnetic levitation train.

Figure 15:
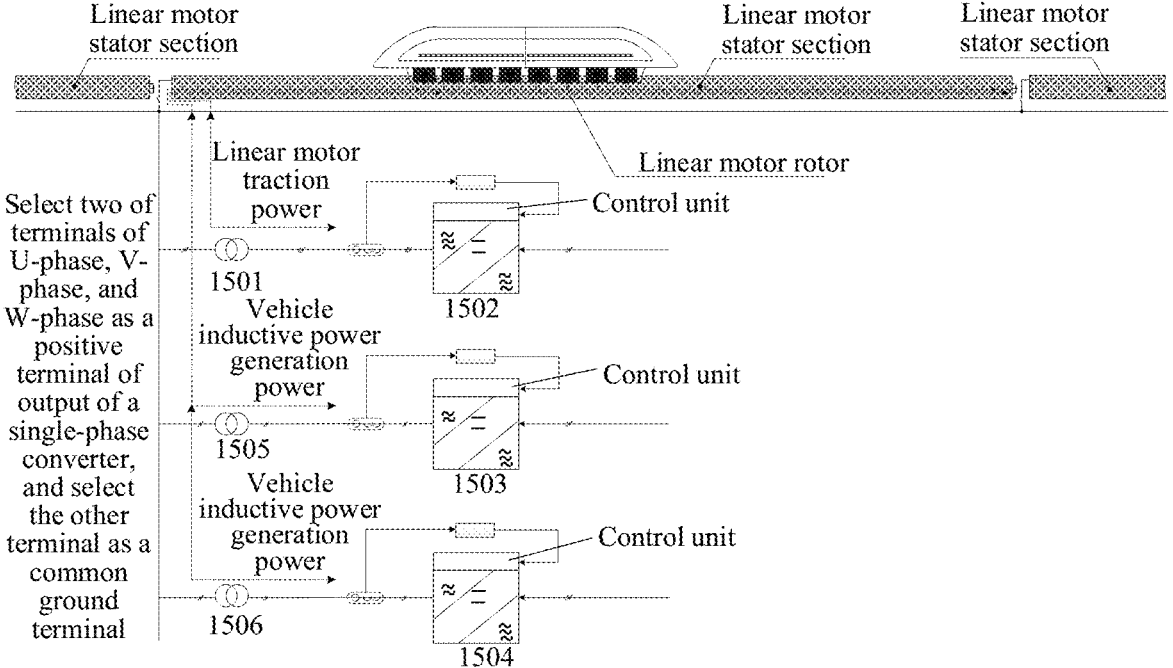

(3.2). As shown in FIG. 15, the description of an independent traction transformer component 1501, a traction converter component 1502, a power generation output converter component 1503 and a power generation output converter component 1504 is the same as that in (3.1). However, before the power generation output converter component 1503 and the power generation output converter component 1504 are connected to the stator sections of the linear motor structure, it is required to add an independent power generation transformer component 1505 and an independent power generation transformer component 1506. The independent power generation transformer component 1505 and the independent power generation transformer component 1506 perform transformation on the vehicle inductive power generation power.

Figure 16:
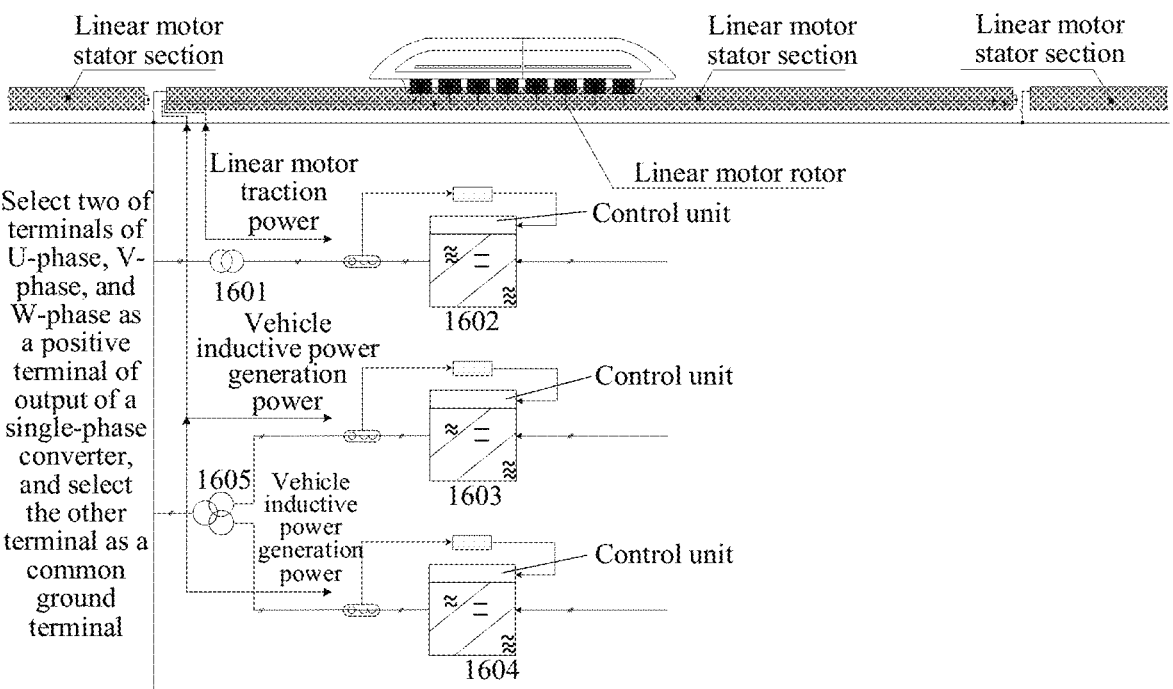

(3.3). As shown in FIG. 16, the description of an independent traction transformer component 1601, a traction converter component 1602, a power generation output converter component 1603 and a power generation output converter component 1604 is the same as that in (3.1). However, before the power generation output converter component 1603 and the power generation output converter component 1604 are connected to the stator sections of the linear motor structure, it is required to add an independent primary winding transformer component 1605. The power generation output converter component 1603 and the power generation output converter component 1604 are connected to a primary side of the independent primary winding transformer component 1605, and a secondary side of the independent primary winding transformer component 1605 is connected to the stator sections of the linear motor structure.

Figure 17:
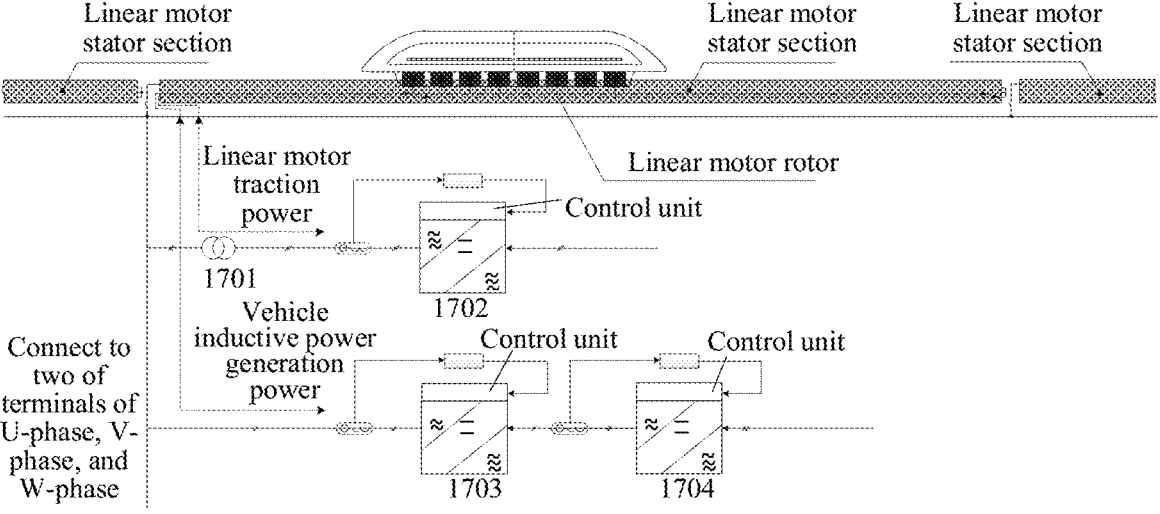
Figure 18:
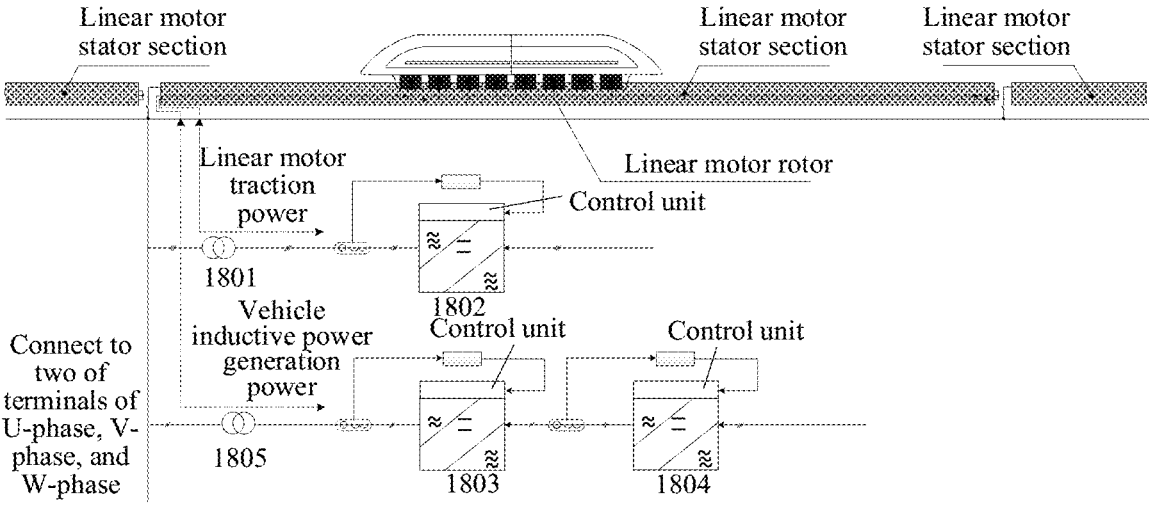

(3.4). As shown in FIG. 17, the description of an independent traction transformer component 1701, a traction converter component 1702, a power generation output converter component 1703 and a power generation output converter component 1704 is the same as that in (3.1), and is different from the above (3.1), (3.2) and (3.3) in that the power generation output converter component 1703 and the power generation output converter component 1704 are connected in series. By the connection in series, two pieces of vehicle inductive power generation power information in the two-single phase manner are actually connected in series to be one piece of vehicle inductive power generation power information, and only the output terminal of the power generation output converter component 1703 is required to be connected to two of three-phase terminals of U-phase, V-phase and W-phase of the stator sections of the linear motor structure. Alternatively, as shown in FIG. 18, after being connected in series, the power generation output converter component 1803 and the power generation output converter component 1804 are connected to any two of three-phase terminals of U-phase, V-phase, and W-phase of the stator sections of the linear motor structure through an independent power generation transformer component 1805.

A situation in which the other linear motor carried information is the vehicle inductive power generation power information is described in the above situation I. A situation in which the other linear motor carried information is a train communication signal is described in detail in embodiments.

In the description of train-ground communication in the above section 2, it is described that the architecture for train-ground communication for controlling high-speed magnetic levitation train shown in FIG. 4 has the following disadvantages: the control of the train completely relies on the system for train-ground communication, and independent backup communication is not provided. In the architecture for train-ground communication for controlling a traditional rail transit train shown in FIG. 5, there is a set of signals for controlling a track circuit as backup. When wireless communication fails, the signals for controlling the track circuit support the train to continue traveling in a degraded speed. When the signals for controlling the track circuit is also unavailable at the same time, the driver may visually control the train to travel at a slow speed under a manual dispatch command. In the current high-speed magnetic levitation transportation system, the train is completely suspended in the air when traveling, microwave communication is utilized for the train-ground communication, and the microwave communication has channel redundancy. The disadvantage is that the magnetic levitation transportation system completely relies on the microwave communication between the train and the ground, and there is no independent backup communication. Once all of channels for microwave communication fail, the train cannot travel continually and can only be stopped.

In order to improve the system safety and reliability of the magnetic levitation train, an independent transmission channel for the train communication signal is required. Therefore, the train communication signal may be transmitted through a channel for carrying the linear motor traction power information that is constructed based on the linear motor structure according to the present disclosure.

Figure 19:
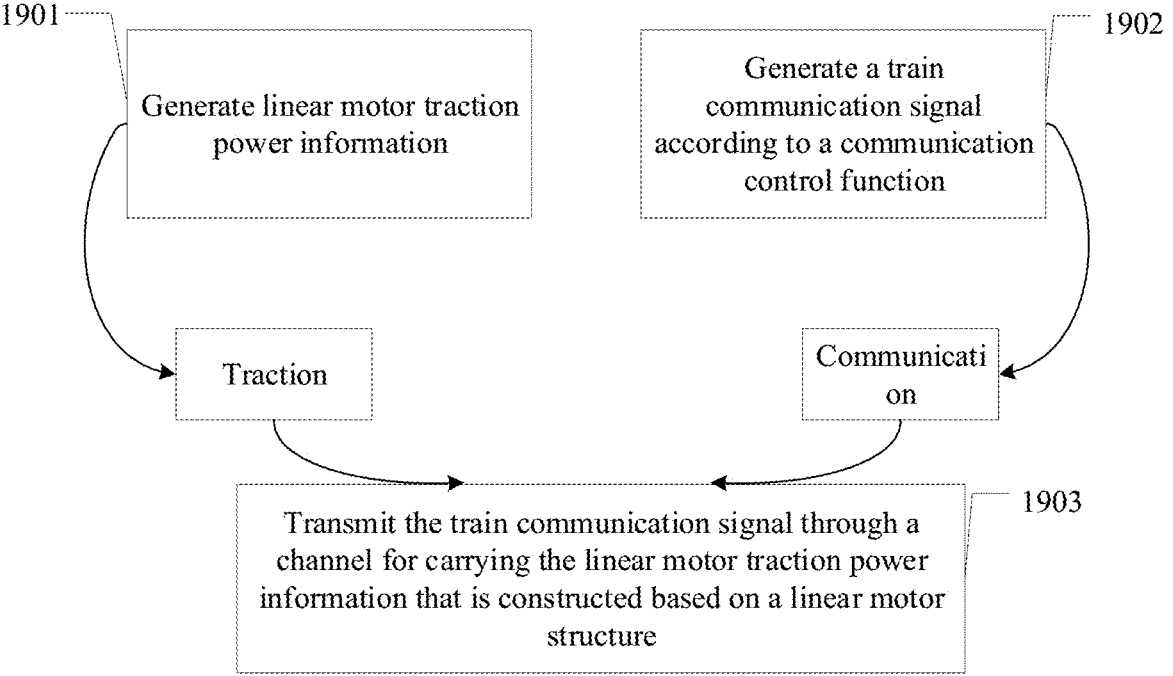
FIG. 19 is a schematic flowchart of a method for performing multi-carrying of a linear motor for magnetic levitation transportation according to another embodiment of the present disclosure.

Based on the above, as shown in FIG. 19, a method for performing multi-carrying of a linear motor for magnetic levitation transportation is provided according to an embodiment of the present disclosure. The method includes steps 1901 to 1903.

In step 1901, linear motor traction power information is generated based on a traction demand of a magnetic levitation train.

In the present embodiment, reference is made to the description of the step 601 in the embodiment shown in FIG. 6.

In step 1902, a train communication signal is generated according to a communication control function.

Figure 22:
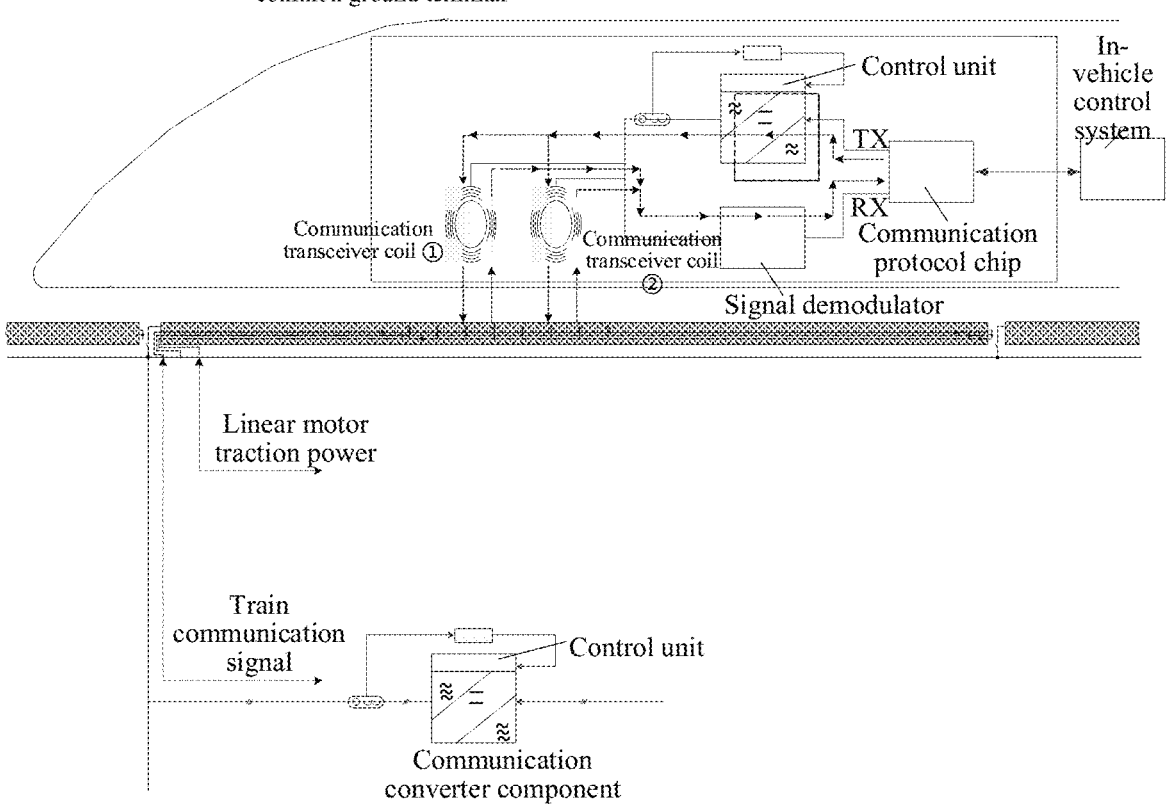
FIG. 22 is an architecture diagram of a system for performing multi-carrying of a linear motor for magnetic levitation transportation with a two-channel communication inductive coil according to the present disclosure.

In the present embodiment, since digital communication information is transmitted between the ground and the magnetic levitation train, and alternating current and voltage are transmitted by the channel, it is required to perform digital-to-analog conversion according to a communication control function to obtain an analog train communication signal. The communication control function is based on frequency shift keying technology, and the train communication signal does not affect a normal traction function of the train. In the present embodiment, a typical frequency shift keying (FSK) communication function is used as an example. In practice, the communication control function includes, but not limited to, the typical function. The frequency shift keying technology is widely used in the field of rail transportation, to transmit digital information based on a frequency variation of a carrier wave. The frequency of the carrier wave varies with a binary baseband signal between two frequency points f1 and f2. The typical waveform of FSK is shown in FIG. 22, and an expression is generally as follows:

$$e_{2FSK}(t) = \begin{cases} A\cos(\omega_1 t + \varphi_n), \text{ in a case that 1 is transmitted,} \\ A\cos(\omega_1 t + \varphi_n), \text{ in a case that 0 is transmitted.} \end{cases}$$

Figure 20:
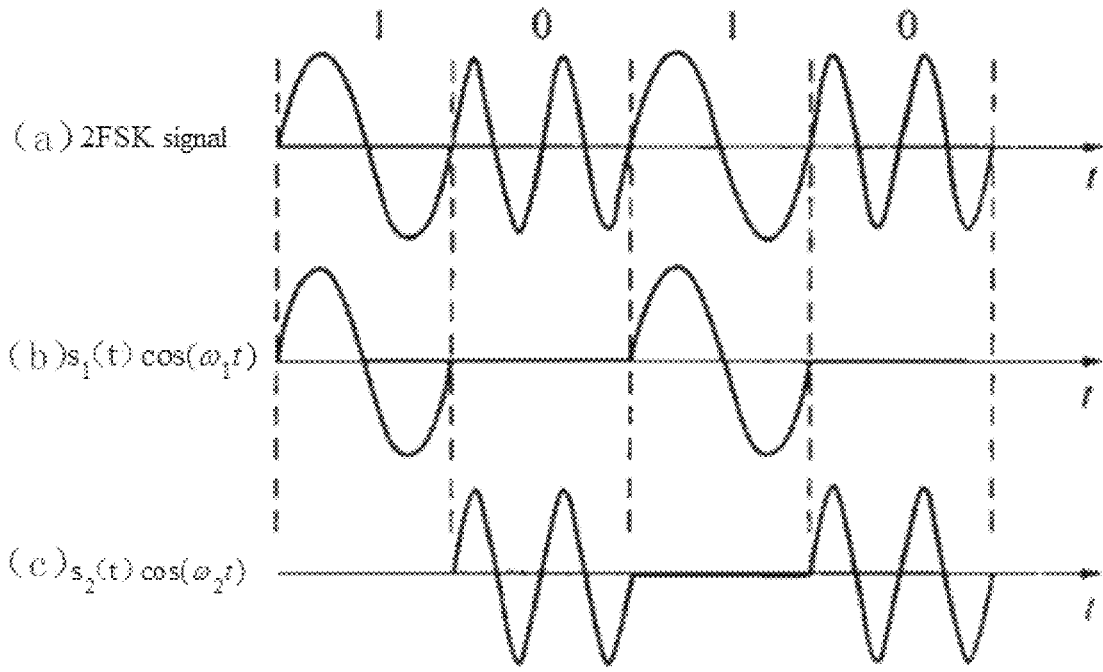
FIG. 20 is a typical waveform diagram of FSK.

In FIG. 20, a model (a) of the 2FSK signal may be decomposed into a waveform (b) and a waveform (c), which can be regarded as the superposition of two 2ASK signals of different carrier frequencies. Therefore, a time-domain expression of the 2FSK signal may be expressed as $$e_{2FSK}(t) = \left[\sum_n a_n g(t-nT_s)\right]\cos(\omega_1 t + \varphi_n) + \left[\sum_n \overline{a}_n g(t-nT_s)\right]\cos(\omega_2 t + \theta_n).$$

In the above expression, $g_n(t)$ represents a single rectangular pulse, $T_s$, represents a pulse duration, and $\varphi_n$ and $\theta_n$ are initial phases of the n-th signal symbol. The $\varphi_n$ and $\theta_n$ may generally be set to zero. Therefore, the above expression may be simplified to obtain the following expression:

$$e_{2FSK}(t) = s_1(t)\cos\omega_1 t + s_2(t)\cos\omega_2 t,$$

$$s_1(t) = \sum_n a_n g(t-nT_s),$$

$$s_2(t) = \sum_n \overline{a}_n g(t-nT_s).$$

The 2FSK signal is limited in amplitude, differentiated, and rectified to form a sharp pulse sequence corresponding to the frequency variation. The sharp pulse sequence is frequency-amplitude converted through a signal processing circuit. Digital signals "1" and "0" may be restored. Therefore, after applying the train communication signal to the stator sections of the linear motor, the rotor of the linear motor is analyzed according to the above theory, and the train communication signal may be restored.

In step 1903, the train communication signal is transmitted through a channel for carrying the linear motor traction power information that is constructed based on a linear motor structure.

In the present embodiment, if the train communication signal is to be received, a signal demodulator specially used for demodulating the signal and a communication transceiver coil are required. It should be noted that the communication transceiver coil may use the existing vehicle inductive power generation coil for multiplexing. Since the vehicle inductive power generation power information and the train communication signal are limited to respective frequency bands different from each other, the signal demodulator is only required to demodulate a frequency band corresponding to the train communication signal to obtain the train communication signal. The communication transceiver coil may be arranged on the same vehicle as an in-vehicle operation control host of the magnetic levitation train and a microwave communication antenna of the train. The communication transceiver coil may also be arranged on any vehicle of the magnetic levitation train, and may be connected to a train control network as required. More specifically, the communication transceiver coil may be arranged on the rotor of the linear motor, on a magnetic levitation frame or on the body of the magnetic levitation train.

It should be noted that the communication converter component that outputs the train communication signal is connected to the stator sections of the linear motor structure in a three-phase manner, a single-phase manner or a two-single phase manner. The connection in the three-phase manner may be referred to the above situation I. It is only required to replace the power generation output converter component with the communication converter component in (1.1), (1.2) and (1.3) of inputting the vehicle inductive power generation power information to the stator sections of the linear motor structure in a three-phase manner. The connection in the single-phase manner may be referred to the above situation I. It is only required to replace the power generation output converter component with the communication converter component in (2.1), (2.2) and (2.3) of inputting the vehicle inductive power generation power information to the stator sections of the linear motor structure in a three-phase manner. The connection in the two-single phase manner may be referred to the above situation I. It is only required to replace the power generation output converter component with the communication converter component in (3.1), (3.2), (3.3) and (3.4) of inputting the inductive power generation power information to the stator sections of the linear motor structure in a three-phase manner. That is, it is only required to replace the power generation output converter component in FIG. 8 to FIG. 18 with the communication converter component, and replace the vehicle inductive power generation power with the train communication signal.

Figure 21:
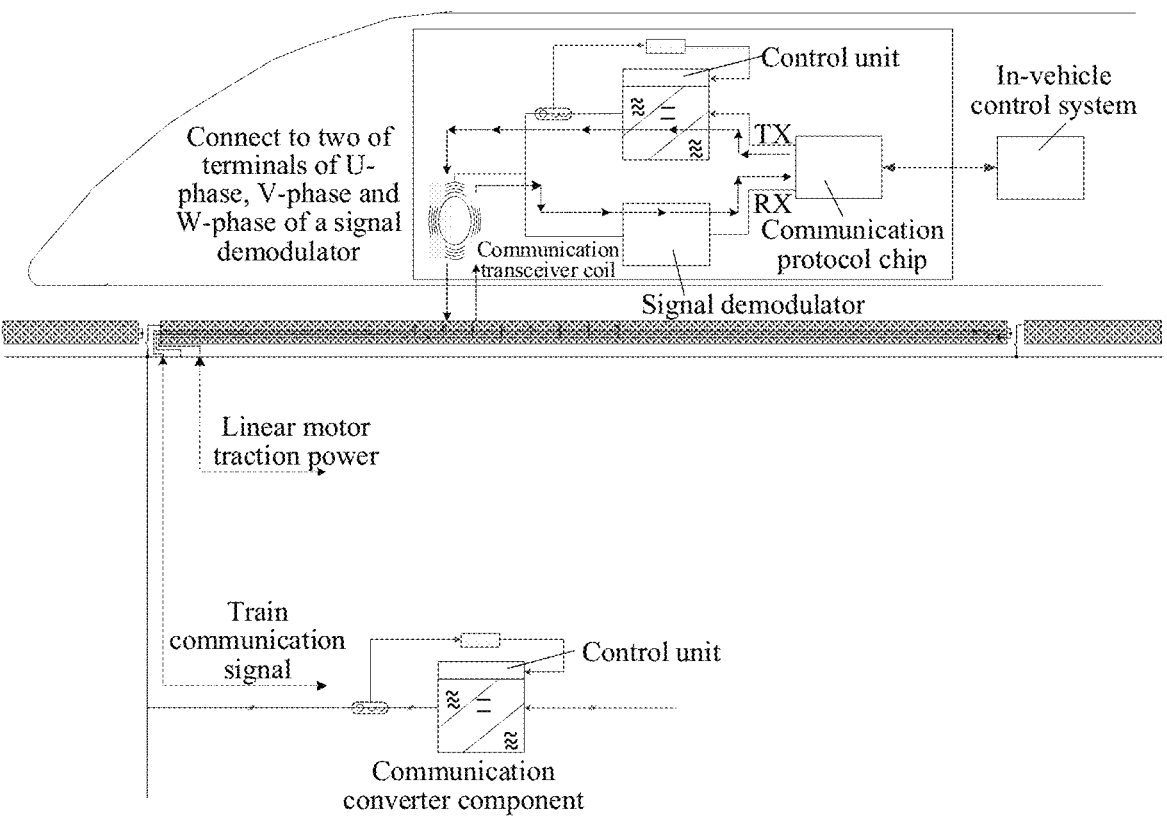
FIG. 21 is an architecture diagram of a system for performing multi-carrying of a linear motor for magnetic levitation transportation with a single-channel communication inductive coil according to the present disclosure.

It should be noted that the communication inductive coil may be in a single-channel or two-channel manner. In the single-channel manner, only one communication inductive coil is arranged, the connection is as shown in FIG. 21. The communication transceiver coil is connected to any two of three-phase terminals of U-phase, V-phase, and W-phase of a signal demodulator. In the two-channel manner, there are two communication inductive coils, and the connection is shown as in FIG. 22. Any two of three-phase terminals of U-phase, V-phase, and W-phase of the signal demodulator each serves as a positive terminal of a single communication transceiver coil 1 and a single communication transceiver coil 2, and the other terminal serves as a common ground terminal. In order to receive and transmit the train communication signal, the support of a communication protocol chip is required for an in-vehicle control system and the signal demodulator. In a topology structure for modulating and demodulating wireless communication of train control information of single-stage converters, two-stage converters, three-stage converters and converters having a stage number of more than three in the stator sections of the linear motor, an operating frequency and a bandwidth of high and low voltage converters used meet communication requirements. This structure supports, but not limited to, FSK, Lonworks, RS485/232, MVB/WTB, Ethernet, CAN and other communication standards.

In the above situation I, it is specifically described the situation in which the other linear motor carried information is the vehicle inductive power generation power information, and both of the traction power of the linear motor and the vehicle inductive power generation power are independently outputted by the traction converter component and the power generation output converter component. In the above situation II, it is specifically described the situation in which the other linear motor carried information is the train communication signal, and both of the traction power of the linear motor and the train communication signal are independently outputted by the traction converter component and the communication converter component. In the following situation III, it is described the situation in which the traction converter component and the power generation output converter component are integrated, the situation in which the traction converter component and the communication converter component are integrated, and the situation in which the traction converter component, the power generation output converter component, and the communication converter component are integrated.

III. The other linear motor carried information includes the vehicle inductive power generation power information and the train communication signal.

It is defined that the linear motor traction power information, the vehicle inductive power generation power information and the train communication signal are in frequency bands different from each other, the frequency band of the linear motor traction power information is lower than the frequency band of the vehicle inductive power generation power information, and the frequency band of the vehicle inductive power generation power information is lower than the frequency band of the train communication signal. The linear motor traction power ranges from zero to tens of megavolt-ampere, and the vehicle inductive power generation power ranges from zero to hundreds of kilowatts. The train communication signal transmitted in a two-way manner is measured by the real-time and error-free transmission of information, rather than by power.

When the integration is performed, it is only required to add harmonics of a specific frequency under a premise that the linear motor traction power information serves as a baseband, as the vehicle inductive power generation power information and the train communication signal. Integration includes three types in FIG. 23, FIG. 24, and FIG. 25, which are described in the following.

Figure 23:
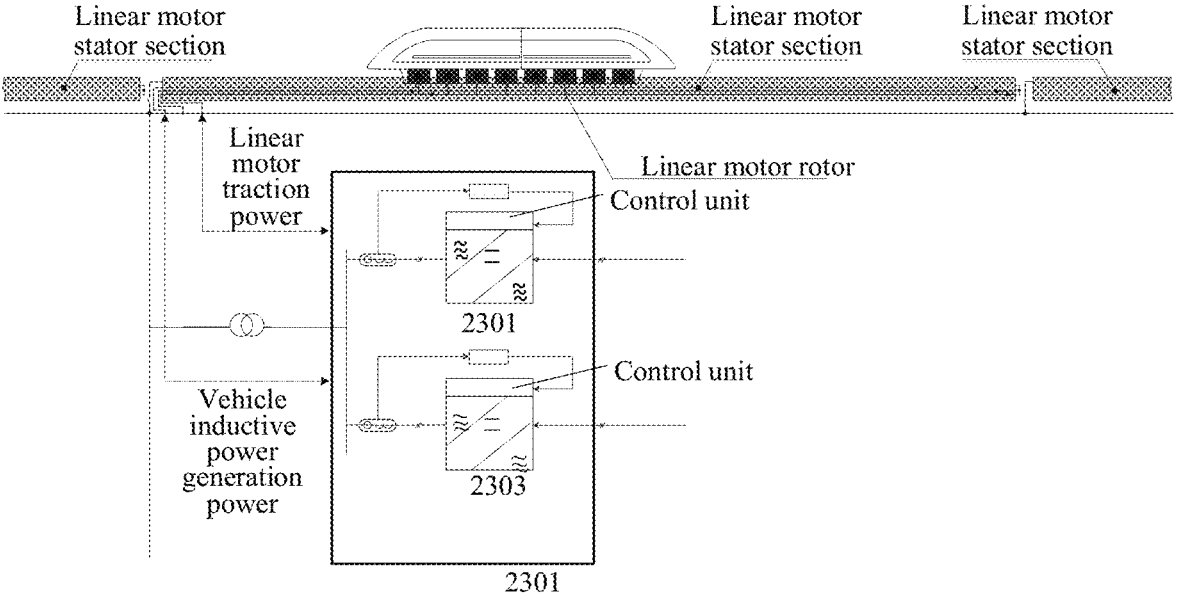
FIG. 23 is an architecture diagram of a system for performing multi-carrying of a linear motor for magnetic levitation transportation integrated with a traction converter component and a power generation output converter component according to the present disclosure.

As shown in FIG. 23, an integrated traction and power generation converter component 2501 includes functions of a traction converter component 2502 and a power generation output converter component 2503. The linear motor traction power information and the vehicle inductive power generation power information are combined to obtain first combined information. The first combined information is transmitted through the linear motor stator sections. The linear motor traction power is received through coupling of the rotor of the linear motor structure. The vehicle inductive power generation power is received through coupling of the vehicle inductive power generation coil.

Figure 24:
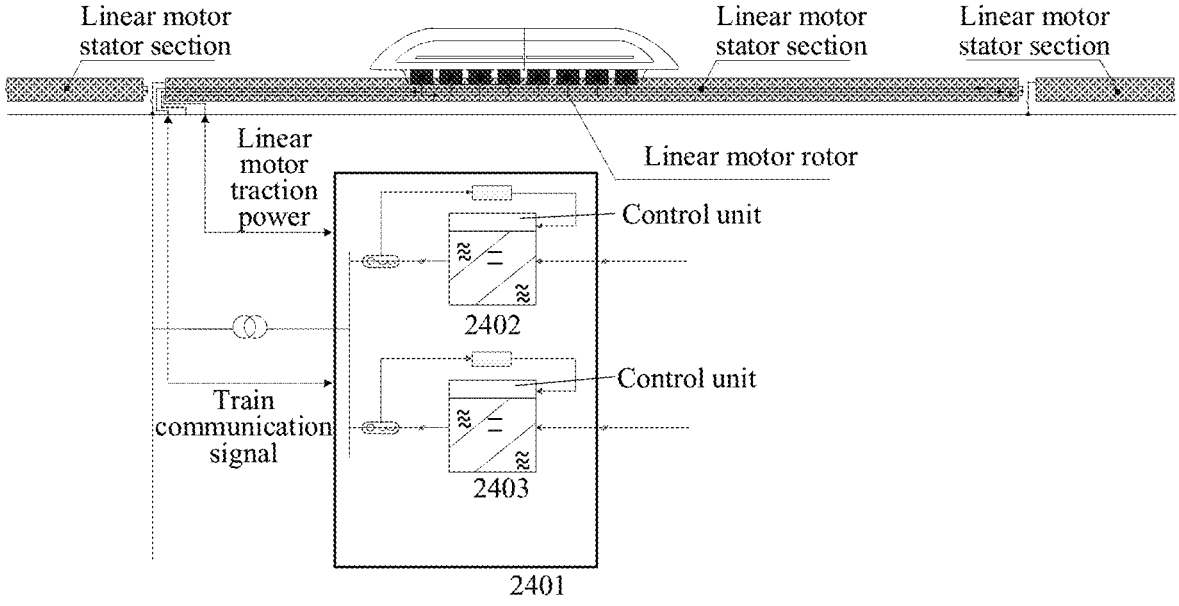
FIG. 24 is an architecture diagram of a system for performing multi-carrying of a linear motor for magnetic levitation transportation integrated with a traction converter component and a communication converter component according to the present disclosure.

Alternatively, as shown in FIG. 24, an integrated traction and communication converter component 2401 includes functions of the traction converter component 2402 and the communication converter component 2403. The linear motor traction power information and the train communication signal are combined to obtain second combined information. The second combined information is transmitted through the stator sections of the linear motor. The linear motor traction power is received through coupling of the rotor of the linear motor structure. The signal demodulator demodulates the coupled signal to obtain the train communication signal through coupling of the communication transceiver coil.

Figure 25:
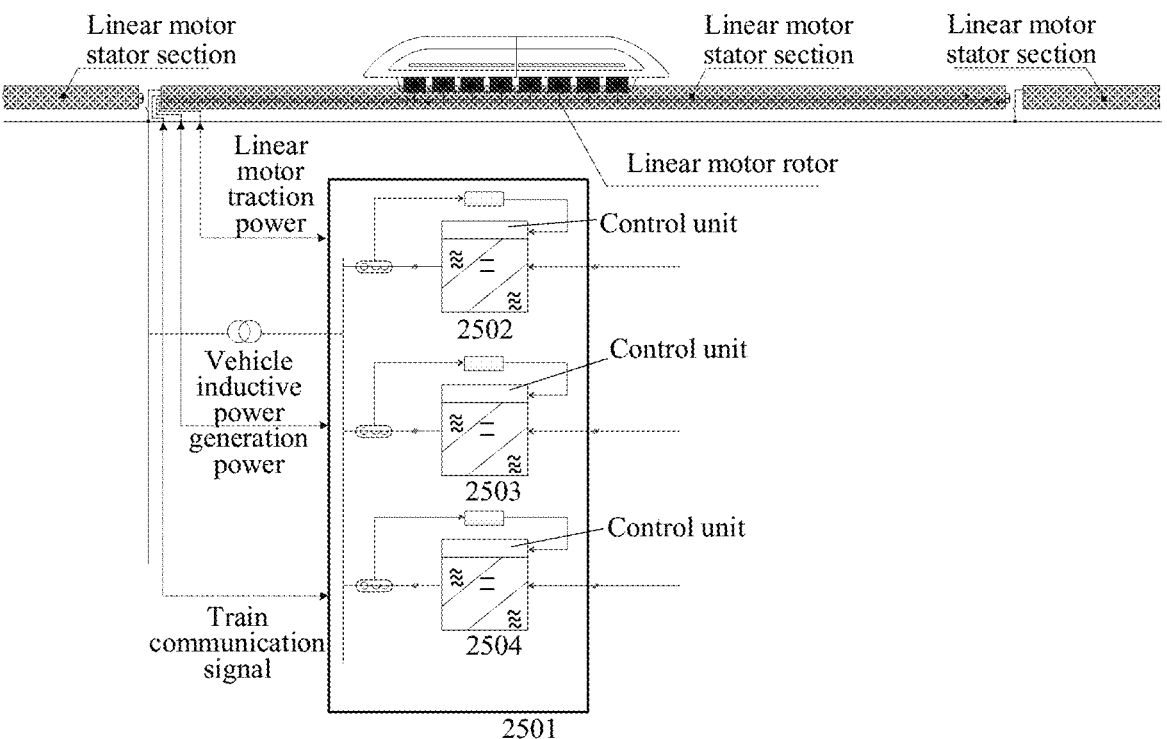
FIG. 25 is an architecture diagram of a system for performing multi-carrying of a linear motor for magnetic levitation transportation integrated with a traction converter component, a power generation output converter component, and a communication converter component according to the present disclosure.

Alternatively, as shown in FIG. 25, an integrated traction and communication converter component 2501 includes functions of a traction converter component 2502, a power generation output converter component 2503 and a communication converter component 2504. The linear motor traction power information, the vehicle inductive power generation power information, and the train communication signal are combined to obtain third combined information. The third combined information is transmitted through the stator sections of the linear motor. The linear motor traction power is received through coupling of the rotor of the linear motor structure. The vehicle inductive power generation power is received through coupling of the vehicle inductive power generation coil. The signal demodulator demodulates the coupled signal to obtain the train communication signal through coupling of the communication transceiver coil.

It should be noted that an independent transformer component is shown in each of the above FIGS. 23, 24 and 25. In practice, the vehicle inductive power generation power information and the train communication signal may also be directly connected to the linear motor stator sections, and thus the independent transformer component in the FIGS. 23, 24 and 25 is no longer required.

Figure 26:
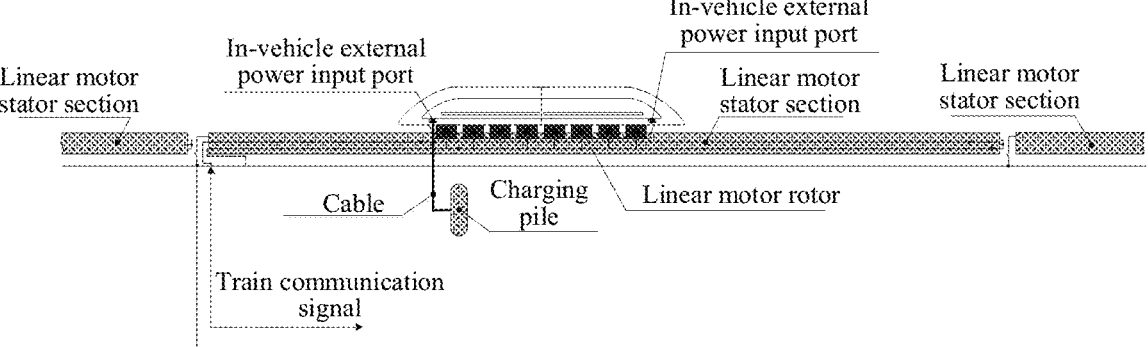
FIG. 26 is a schematic diagram illustrating an operation of charging a magnetic levitation train by a charging pile according to the present disclosure.

Preferably, on the basis of the above embodiment, a method for charging a magnetic levitation train is provided according to the present disclosure. That is, the magnetic levitation train is charged by using a charging pile in a case that the magnetic levitation train is stopped at a station or is maintained. Since in a case that the magnetic levitation train is stopped at a station for a long time, or the vehicle is stopped in a maintenance warehouse, a coupling distance between a horizontally laid linear motor stator and the vehicle inductive power generation coil increases significantly (for example, increases from 10 mm to 25 mm). In this case, a magnetic flux surface that may be coupled by the vehicle inductive power generation coil becomes smaller, and the power generation efficiency becomes lower. The above vehicle inductive power generation may be suspended, and a more efficient charging mode using the charging pile may be used. As shown in FIG. 26, a charging pile is shown. The charging pile is connected to the body of the magnetic levitation train through a cable. In an embodiment, the connection is implemented through an in-vehicle external power input port. The in-vehicle external power input port is generally arranged at the beginning and the end of the magnetic levitation train. In addition, in order to ensure the reliable control of the magnetic levitation train, the channel of the train communication signal should be normal.

Preferably, in the above embodiment, the linear motor structure includes a unilateral linear motor, a bilateral linear motor, and a multilateral linear motor in type; and the rotor of the linear motor structure includes a permanent magnet rotor, an electric excitation rotor and a permanent magnet-electric excitation hybrid rotor in magnetic type.

Preferably, on the basis of the above embodiment, in order to ensure that the traction power, the power generation power and the train communication signal carried by the linear motor are independent, it is also required to provide a corresponding band-pass filter for each piece of information, so as to ensure that the traction power, the power generation power and the train communication signal are controlled independently.

Figure 27:
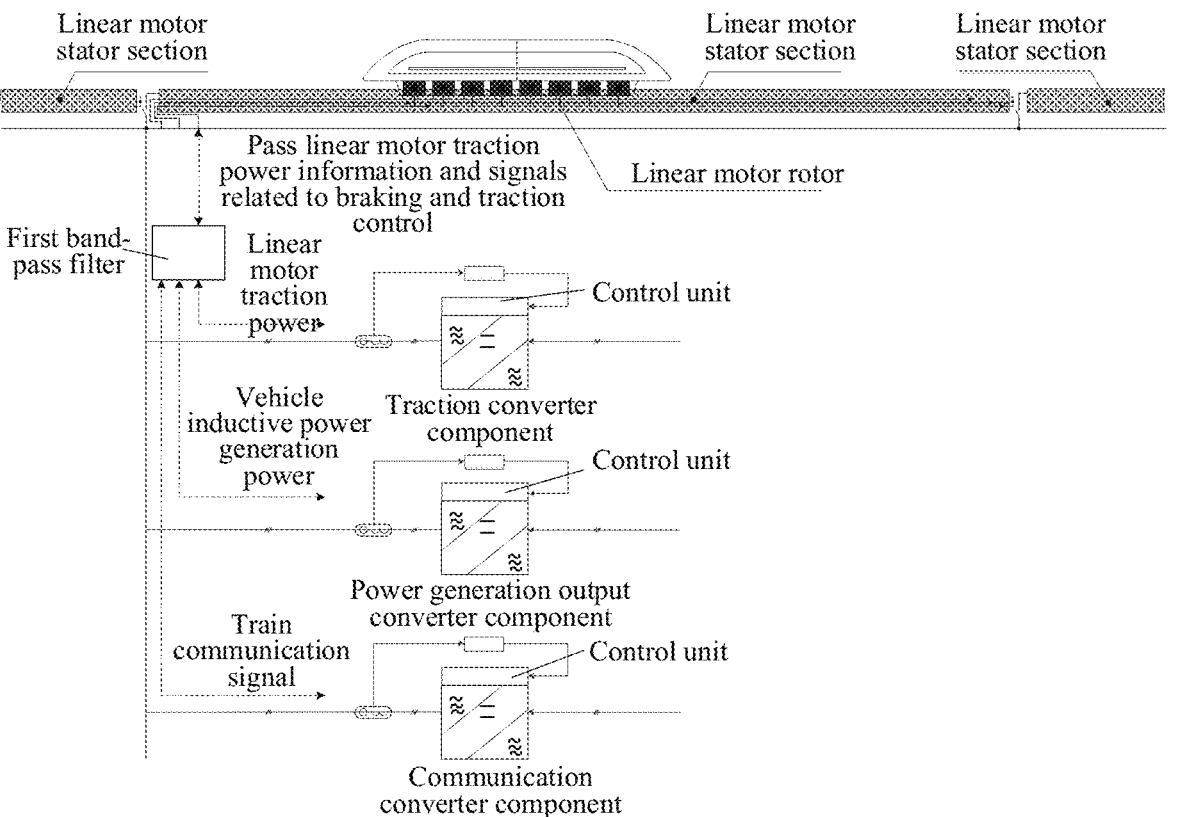
FIG. 27 is an architecture diagram of a system for performing multi-carrying of a linear motor for magnetic levitation transportation with a first band-pass filter according to the present disclosure.

As shown in FIG. 27, first band-pass filtering is performed on the linear motor traction power information and the other linear motor carried information by a first band-pass filter, to pass the linear motor traction power information and signals related to braking and traction control. The signals may be related to a fundamental wave and effective harmonics of the linear motor traction power, train braking energy and information, and a traction control switching frequency, so as to decouple a control feedback signal of the linear motor under a multi-carrying condition, and to decouple other signals under the multi-carrying condition, to ensure the control quality of the linear motor traction. Here, the energy and information are transmitted bidirectionally between the converters on the ground and the in-vehicle equipment through the first band-pass filter. It should be noted that the braking energy and control information is transmitted back from the in-vehicle equipment to the converters on the ground.

Figure 28:
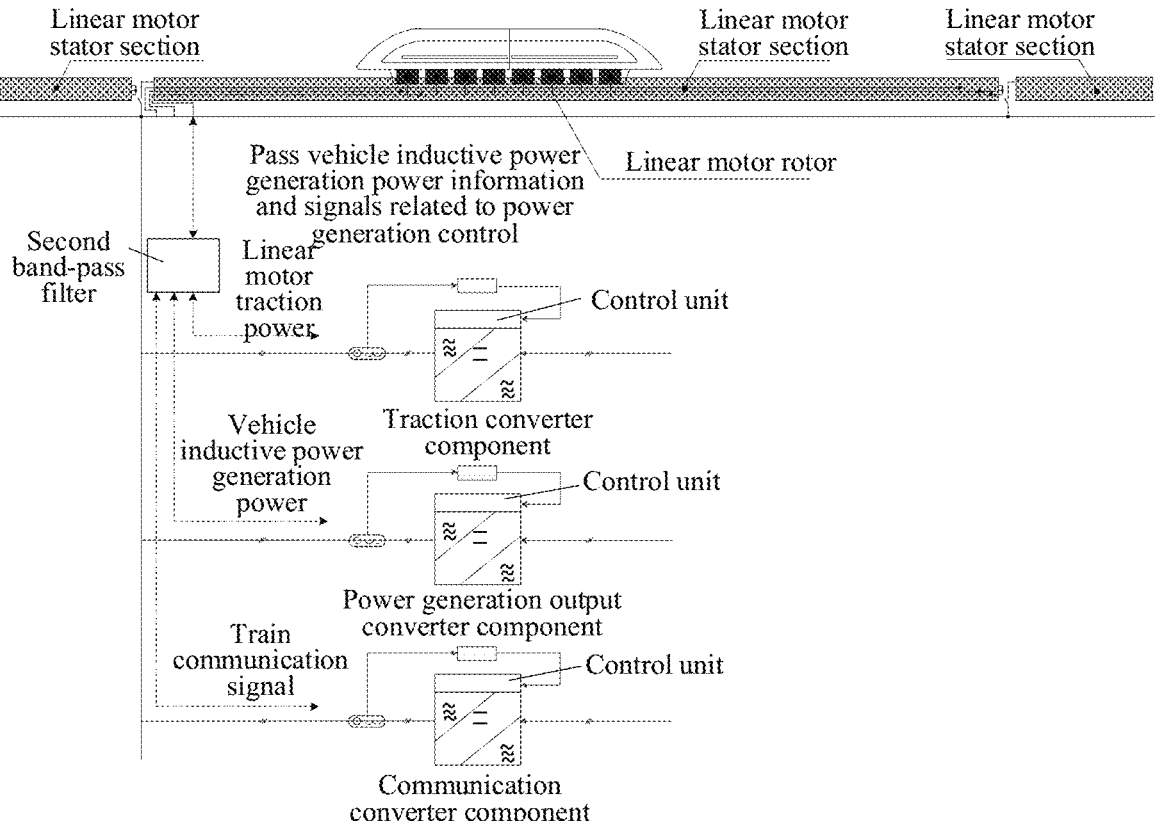
FIG. 28 is an architecture diagram of a system for performing multi-carrying of a linear motor for magnetic levitation transportation with a second band-pass filter according to the present disclosure.

As shown in FIG. 28, second band-pass filtering is performed on the linear motor traction power information and the other linear motor carried information by a second band-pass, to pass the vehicle inductive power generation power information and signals related to power generation control. The signals may be related to a fundamental wave and effective harmonics of the vehicle inductive power generation power, and a switching frequency of the power generation control, to decouple a control feedback signal of vehicle power generation under a multi-carrying condition, and to decouple other signals under the multi-carrying condition, to ensure the control quality of the vehicle power generation.

Figure 29:
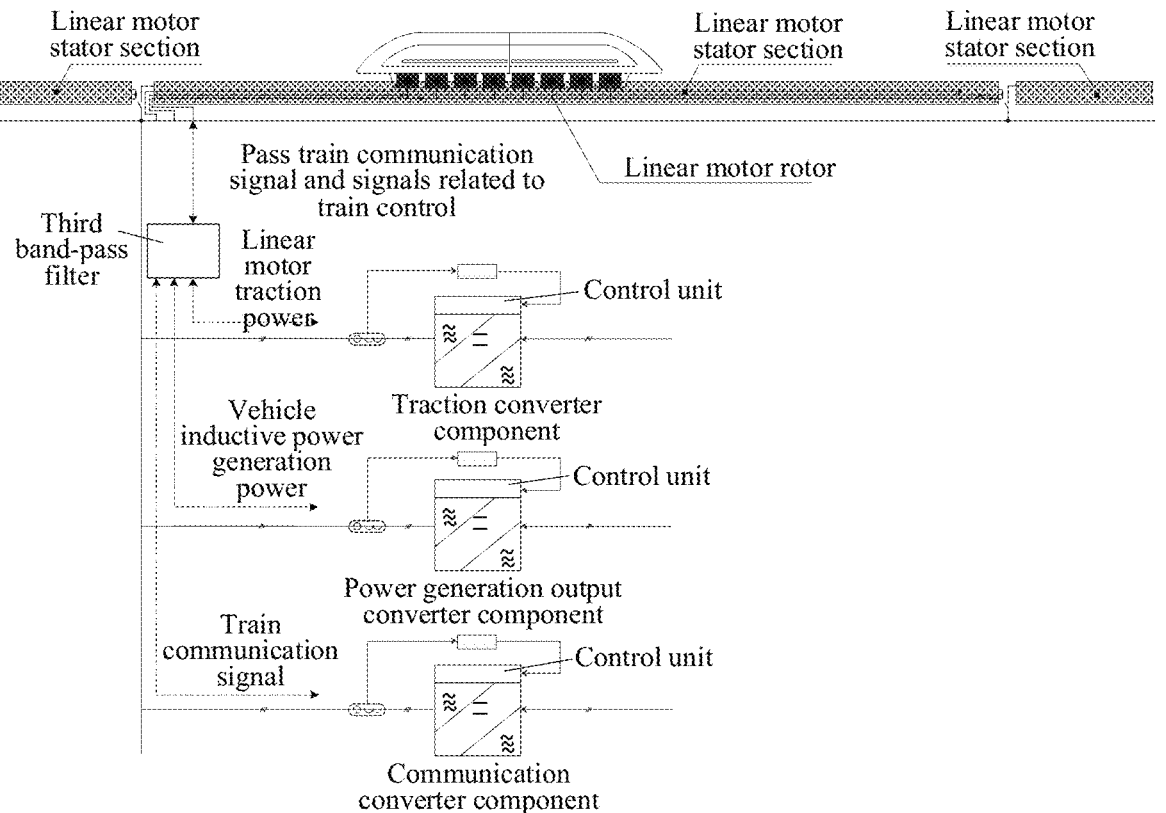
FIG. 29 is an architecture diagram of a system for performing multi-carrying of a linear motor for magnetic levitation transportation with a third band-pass filter according to the present disclosure.

As shown in FIG. 29, third band-pass filtering is performed on the linear motor traction power information and the other linear motor carried information by a third band-pass filter, to pass the train communication signal and signals related to train control. The signals may be related to a modulated wave and effective harmonics of the train communication signal, and a switching frequency, to decouple the train communication signal under a multi-carrying condition, and to decouple other signals under the multi-carrying condition, to ensure the transmission quality of the train communication signal. Herein, the train communication signal is transmitted bidirectionally between the converters on the ground and the in-vehicle equipment through the third band-pass filter.

The various embodiments in the specification are described in a progressive manner, and each of the embodiments emphasizes the differences from other embodiments, and the same and similar parts among the embodiments can be referred to each other. As for the apparatus disclosed in the embodiment, since it corresponds to the method disclosed in the embodiment, the description of the apparatus is relatively simple, and the relevant part can be referred to the description of the method.

It should be noted that, terms of "include", "comprise" or any other variants are intended to be non-exclusive. Therefore, a process, method, article or device including a series of elements includes not only these elements but also other elements that are not enumerated, or also include elements inherent for the process, method, article or device. Unless expressively limited otherwise, the statement of "comprising (including) one . . . " does not exclude the case that other similar elements exist in the process, method, article or device.

The above illustration of the disclosed embodiments enables those skilled in the art to implement or practice the present disclosure. Many changes to these embodiments are apparent for those skilled in the art, and general principles defined herein can be implemented in other embodiments without departing the spirit or scope of the present disclosure. Hence, the present disclosure is not limited to the embodiments disclosed herein, but is to conform to the widest scope consistent with principles and novel features disclosed herein.

The invention claimed is:

1. A method for performing multi-carrying of a linear motor for magnetic levitation transportation, comprising:

generating linear motor traction power information and other linear motor carried information; and transmitting the other linear motor carried information through a channel for carrying the linear motor traction power information that is constructed based on a linear motor structure;

wherein the other linear motor carried information comprises at least one of vehicle inductive power generation power information and a train communication signal, and wherein the vehicle inductive power generation power information is generated by a power generation output converter component in a converter module matching the linear motor structure.

2. The method according to claim 1, wherein the generating linear motor traction power information and other linear motor carried information comprises:

generating the linear motor traction power information based on a traction demand of a magnetic levitation train;

generating the vehicle inductive power generation power information according to a power generation control function; and/or generating the train communication signal according to a communication control function, wherein the vehicle inductive power generation power information, the train communication signal and the linear motor traction power information are in frequency bands different from each other.

3. The method according to claim 2, wherein the generating the vehicle inductive power generation power information according to a power generation control function comprises:

calculating an output terminal voltage U according to an output terminal voltage formula of the power generation control function, $$U = \sum_{n=1}^{m} L_n * \frac{di}{dt} + i * \sum_{n=1}^{m} R_n + \hat{U}, L = \sum_{n=1}^{m} L_n$$

24 wherein m represents a number of stator sections of a linear motor, L represents a total inductance of the stator sections of the linear motor, $L_n$ represents an inductance of a nth stator section, $1 \le n \le m$, $R_n$ represents a resistance of a stator winding of the nth stator section corresponding to $L_n$, i represents a stator current, and $\hat{U}$ represents a back electromotive force generated by the magnetic levitation train on a stator winding;

calculating an output traction force $F_{transaction}(t)$ according to an output traction force formula constructed based on the traction demand of the magnetic levitation train and the power generation control function, $$F_{traction}(t) = A * K_V + B * (1 - K_V)$$

wherein A and B each represents a parameter related to the stator current i and a vehicle structure of the magnetic levitation train, and $K_v$ represents a speed factor;

calculating an output voltage $U_{generation}$ according to an output voltage formula constructed based on the power generation control function, $$U_{generation} = C * (1 - K_V) + D * V * K_V$$

wherein C represents a parameter related to the stator current i and the structure of the magnetic levitation train, D represents a parameter related to the structure of the magnetic levitation train, and V represents a speed of the magnetic levitation train;

calculating a traction power $f(t)_{traction}$ based on a product of the output traction force $F_{traction}(t)$ and V;

calculating the vehicle inductive power generation power $f(t)_{generation}$ by multiplying the output voltage $U_{generation}$ by a current of a vehicle inductive power generation coil; or calculating the vehicle inductive power generation power $f(t)_{generation}$ by dividing a square of the output voltage $U_{generation}$ by an equivalent resistance of a receiving loop of the vehicle inductive power generation coil.

4. The method according to claim 3, further comprising:

setting a speed threshold of the magnetic levitation train and a weighting coefficient of the speed factor $K_v$ according to a preset control strategy, wherein the speed threshold is not less than zero and not greater than a maximum speed;

determining the speed factor $K_v$ of a current speed of the magnetic levitation train based on the speed threshold;

determining whether a requirement for cogging power generation is met by comparing the current speed with the speed threshold;

generating power based on the vehicle inductive power generation power information, if the requirement for cogging power generation is not met; and cutting off the power generated based on the vehicle inductive power generation power information and performing cogging power generation, if the requirement for cogging power generation is met.

5. The method according to claim 2, wherein the generating the train communication signal according to a communication control function comprises:

acquiring digital communication information;

obtaining an analog train communication signal by performing a digital-to-analog conversion on the digital communication information according to the communication control function.

6. The method according to claim 2, further comprising one of the following:

performing first band-pass filtering on the linear motor traction power information and the other linear motor carried information, to pass the linear motor traction power information and signals related to braking and traction control;

performing second band-pass filtering on the linear motor traction power information and the other linear motor carried information, to pass the vehicle inductive power generation power information and signals related to power generation control; and performing third band-pass filtering on the linear motor traction power information and the other linear motor carried information, to pass the train communication signal and signals related to train control.

7. The method according to claim 1, wherein the transmitting the other linear motor carried information through a channel for carrying the linear motor traction power information that is constructed based on a linear motor structure comprises one of the following:

inputting at least one of the vehicle inductive power generation power information and the train communication signal to stator sections of the linear motor structure in a three-phase manner, and receiving at least one of the vehicle inductive power generation power information and the train communication signal through a rotor of the linear motor structure or a communication transceiver coil;

inputting at least one of the vehicle inductive power generation power information and the train communication signal to stator sections of the linear motor structure in a single-phase manner, and receiving at least one of the vehicle inductive power generation power information and the train communication signal through a rotor of the linear motor structure or a communication transceiver coil; and inputting at least one of the vehicle inductive power generation power information and the train communication signal to stator sections of the linear motor structure in a two-single phase manner, and receiving at least one of the vehicle inductive power generation power information and the train communication signal through a rotor of the linear motor structure or a communication transceiver coil.

8. The method according to claim 7, wherein the inputting at least one of the vehicle inductive power generation power information and the train communication signal to stator sections of the linear motor structure in a three-phase manner comprises one of the following:

inputting at least one of the vehicle inductive power generation power information and the train communication signal directly to the stator sections of the linear motor structure in a three-phase manner;

performing independent transformation on at least one of the vehicle inductive power generation power information and the train communication signal, and inputting the transformed at least one of the vehicle inductive power generation power information and the train communication signal to the stator sections of the linear motor structure in a three-phase manner; and performing independent primary winding transformation on at least one of the vehicle inductive power generation power information and the train communication signal, and inputting the transformed at least one of the vehicle inductive power generation power information and the train communication signal to the stator sections of the linear motor structure in a three-phase manner.

9. The method according to claim 7, wherein the inputting at least one of the vehicle inductive power generation power information and the train communication signal to stator sections of the linear motor structure in a single-phase manner comprises one of the following:

inputting at least one of the vehicle inductive power generation power information and the train communication signal directly to two of three-phase terminals of the stator sections of the linear motor structure in a single-phase manner;

performing independent transformation on at least one of the vehicle inductive power generation power information and the train communication signal, and inputting the transformed at least one of the vehicle inductive power generation power information and the train communication signal to two of three-phase terminals of the stator sections of the linear motor in a single-phase manner; and performing independent primary winding transformation on at least one of the vehicle inductive power generation power information and the train communication signal both of which are in the single-phase manner; and adding at least one of the vehicle inductive power generation power information and the train communication signal to two of three phases corresponding to the linear motor traction power information, and inputting the transformed at least one of the vehicle inductive power generation power information and the train communication signal to the stator sections of the linear motor structure.

10. The method according to claim 7, wherein the inputting at least one of the vehicle inductive power generation power information and the train communication signal to stator sections of the linear motor structure in a two-single phase manner comprises one of the following:

inputting at least one of the vehicle inductive power generation power information and the train communication signal directly to the stator sections of the linear motor structure in a two-single phase manner, wherein two of three-phase terminals of the stator sections of the linear motor structure serve as a common input terminal, and another terminal serves as a common ground terminal;

performing independent transformation on at least one of the vehicle inductive power generation power information and the train communication signal both of which are in the two-single manner, and inputting the transformed at least one of the vehicle inductive power generation power information and the train communication signal to the stator sections of the linear motor structure, wherein two of three-phase terminals of the stator sections of the linear motor structure serve as a common input terminal, and another terminal serves as a common ground terminal;

performing independent primary winding transformation on at least one of the vehicle inductive power generation power information and the train communication signal both of which are in the two-single manner, and inputting the transformed at least one of vehicle inductive power generation power information and the train communication signal to the stator sections of the linear motor structure, wherein two of three-phase terminals of the stator sections of the linear motor structure serve as a common input terminal, and another terminal serves as a common ground terminal; and inputting in series at least one of the vehicle inductive power generation power information and the train communication signal both of which are in the two-single manner, and inputting at least one of the vehicle inductive power generation power information and the train communication signal connected in series directly to two of three-phase terminals of the stator sections of the linear motor structure, or performing independent transformation on at least one of the vehicle inductive power generation power information and the train communication signal connected in series, and inputting the transformed at least one of the vehicle inductive power generation power information and the train communication signal to two of three-phase terminals of the stator sections of the linear motor structure.

11. The method according to claim 1, wherein the transmitting the other linear motor carried information through a channel for carrying the linear motor traction power information that is constructed based on a linear motor structure comprises:

combining the linear motor traction power information with the vehicle inductive power generation power information to obtain a first combined information, transmitting the first combined information through stator sections of the linear motor structure, and receiving the first combined information through a rotor of the linear motor structure; or combining the linear motor traction power information with the train communication signal to obtain a second combined information, transmitting the second combined information through the stator sections of the linear motor structure, and receiving the second combined information through the rotor of the linear motor structure; or, combining the linear motor traction power information, the vehicle inductive power generation power information, and the train communication signal to obtain a third combined information, transmitting the third combined information through the stator sections of the linear motor structure, and receiving the third combined information through the rotor of the linear motor structure.

12. The method according to claim 11, further comprising:

performing transformation on the first combined information, and transmitting the transformed first combined information through the stator sections of the linear motor structure; or performing transformation on the second combined information, and transmitting the transformed second combined information through the stator sections of the linear motor; or performing transformation on the third combined information, and transmitting the transformed third combined information through the stator sections of the linear motor.

13. The method according to claim 1, wherein the other linear motor carried information comprises a train communication signal, and the transmitting the other linear motor carried information through a channel for carrying the linear motor traction power information that is constructed based on a linear motor structure comprises:

inputting the train communication signal to stator sections of the linear motor structure in a three-phase manner, a single-phase manner or a two-single phase manner, and receiving the train communication signal in a two-channel manner or a single-channel manner through a rotor of the linear motor structure; and inputting the train communication signal to the rotor of the linear motor structure in the two-channel manner or the single-channel manner, and receiving the train communication signal through the stator sections of the linear motor structure.

14. The method according to claim 1, further comprising:

charging the magnetic levitation train by using a charging pile in a case that the magnetic levitation train is stopped at a station or is maintained.

15. The method according to claim 1, wherein the linear motor structure comprises a unilateral linear motor, a bilateral linear motor and a multilateral linear motor in type; and a rotor of the linear motor comprises a permanent magnet rotor, an electric excitation rotor and a permanent magnet-electric excitation hybrid rotor in magnetic type.

16. A system device for performing multi-carrying of a linear motor for magnetic levitation transportation, comprising:

a linear motor structure and a converter module matching the linear motor structure, wherein the linear motor structure comprises stator sections arranged on a ground track and a rotor arranged on a magnetic levitation train, and the converter module is configured to generate linear motor traction power information and other linear motor carried information, and transmit the other linear motor carried information through a channel for carrying the linear motor traction power information that is constructed based on the linear motor structure;

wherein the other linear motor carried information comprises at least one of vehicle inductive power generation power information and a train communication signal, and wherein the vehicle inductive power generation power information is generated by a power generation output converter component in a converter module matching the linear motor structure.

17. The system device according to claim 16, wherein the converter module comprises:

a traction converter component, configured to generate the linear motor traction power information based on a traction demand of the magnetic levitation train;

a power generation output converter component, configured to generate the vehicle inductive power generation power information according to a power generation control function; and/or a communication converter component, configured to generate the train communication signal according to a communication control function, wherein the vehicle inductive power generation power information, the train communication signal and the linear motor traction power information are in frequency bands different from each other.

18. The system device according to claim 17, wherein the power generation output converter component is further configured to calculate an output terminal voltage U according to an output terminal voltage formula of the power generation control function, $$U = \sum_{n=1}^{m} L_n * \frac{di}{dt} + i * \sum_{n=1}^{m} R_n + \hat{U}, \; L = \sum_{n=1}^{m} L_n$$

wherein m represents a number of stator sections of a linear motor, L represents a total inductance of the stator sections of the linear motor, $L_n$ represents an inductance of a nth stator section, $1 \leq n \leq m$, $R_n$ represents a resistance of a stator winding of the nth stator section corresponding to $L_n$, i represents a stator current, and $\hat{U}$ represents a back electromotive force generated by the magnetic levitation train on a stator winding;

the power generation output converter component is further configured to calculate an output traction force $F_{traction}(t)$ according to an output traction force formula constructed based on the traction demand of the magnetic levitation train and the power generation control function, $$F_{traction}(t) = A * K_V + B * (1 - K_V)$$

wherein A and B each represents a parameter related to the stator current i and a vehicle structure of the magnetic levitation train, and $K_v$ represents a speed factor; and the power generation output converter component is further configured to:

calculate an output voltage $U_{generation}$ according to an output voltage formula constructed based on the power generation control function, $$U_{generation} = C * (1 - K_V) + D * V * K_V$$

wherein C represents a parameter related to the stator current i and the vehicle structure of the magnetic levitation train, D represents a parameter related to the vehicle structure of the magnetic levitation train, and V represents a speed of the magnetic levitation train;

calculate a traction power $f(t)_{traction}$ based on a product of the output traction force $F_{traction}(t)$ and V;

calculate the vehicle inductive power generation power $f(t)_{generation}$ by multiplying the output voltage $U_{generation}$ by a current of a vehicle inductive power generation coil; or calculate the vehicle inductive power generation power $f(t)_{generation}$ by dividing a square of the output voltage $U_{generation}$ by an equivalent resistance of a receiving loop of the vehicle inductive power generation coil.

19. The system device according to claim 18, further comprising:

a power generation switching handover control module, configured to set a speed threshold of the magnetic levitation train and a weighting coefficient of the speed factor $K_v$ according to a preset control strategy, wherein the speed threshold is not less than zero and not greater than a maximum speed, the power generation switching handover control module is further configured to determine the speed factor $K_v$ of a current speed of the magnetic levitation train based on the speed threshold;

the power generation switching handover control module is further configured to determine whether a requirement for cogging power generation is met by comparing the current speed with the speed threshold;

the power generation switching handover control module is further configured to generate power based on the vehicle inductive power generation power information if the requirement for cogging power generation being not met; and the power generation switching handover control module is further configured to cut off the power generated based on the vehicle inductive power generation power information and perform cogging power generation if the requirement for cogging power generation being met.

20. The system device according to claim 17, wherein the communication converter component is configured to acquire digital communication information, and the communication converter component is further configured to obtain an analog train communication signal by performing a digital-to-analog conversion on the digital communication information according to the communication control function.

21. The system device according to claim 17, wherein the power generation output converter component and/or the communication converter component comprises a three-phase converter, a single-phase converter, or a two-single phase converter.

22. The system device according to claim 17, wherein the power generation output converter component and/or the communication converter component is further configured to input at least one of the vehicle inductive power generation power information and the train communication signal to the stator sections of the linear motor structure in a three-phase manner; and the rotor of the linear motor structure is configured to receive at least one of the vehicle inductive power generation power information and the train communication signal.

23. The system device according to claim 17, further comprising: an independent transformer component for power generation and/or communication, wherein the independent transformer component for power generation and/or communication is configured to perform independent transformation on at least one of the vehicle inductive power generation power information and the train communication signal and input the transformed at least one of the vehicle inductive power generation power information and the transformed train communication signal to the stator sections of the linear motor structure in a three-phase manner; and the rotor of the linear motor structure is configured to receive at least one of the vehicle inductive power generation power information and the train communication signal.

24. The system device according to claim 17, further comprising: an independent primary winding transformer component, wherein the independent primary winding transformer component is configured to perform independent primary winding transformation on at least one of the vehicle inductive power generation power information and the train communication signal;

the independent primary winding transformation component is further configured to input the transformed at least one of the vehicle inductive power generation power information and the train communication signal to the stator sections of the linear motor structure in a three-phase manner; and the rotor of the linear motor structure is configured to receive at least one of the vehicle inductive power generation power information and the train communication signal.

25. The system device according to claim 17, wherein the power generation output converter component and/or the communication converter component is further configured to input at least one of the vehicle inductive power generation power information and the train communication signal directly to two of three-phase terminals of the stator sections of the linear motor structure in a single-phase manner; and the rotor of the linear motor structure is configured to receive at least one of the vehicle inductive power generation power information and the train communication signal.

26. The system device according to claim 17, further comprising: an independent transformer component for power generation and/or communication, wherein the independent transformer component for power generation and/or communication is configured to perform independent transformation on at least one of the vehicle inductive power generation power information and the train communication signal and input the transformed at least one of the vehicle inductive power generation power information and the train communication signal to two of three-phase terminals of the stator sections of the linear motor structure in a single-phase manner; and the rotor of the linear motor structure is configured to receive at least one of the vehicle inductive power generation power information and the train communication signal.

27. The system device according to claim 17, further comprising: an independent primary winding transformer component, wherein the independent primary winding transformer component is configured to: perform independent primary winding transformation on at least one of the vehicle inductive power generation power information and the train communication signal both of which are in the single-phase manner; and add at least one of the vehicle inductive power generation power information and the train communication signal to two of three phases corresponding to the linear motor traction power information;

the independent primary winding transformer component is further configured to input the transformed linear motor traction power information and the transformed at least one of vehicle inductive power generation power information and the train communication signal to the stator sections of the linear motor structure, and the rotor of the linear motor structure is configured to receive at least one of the vehicle inductive power generation power information and the train communication signal.

28. The system device according to claim 17, further comprising:

the power generation output converter component and/or the communication converter component is configured to input at least one of the vehicle inductive power generation power information and the train communication signal directly to the stator sections of the linear motor structure in a two-single phase manner, wherein two of three-phase terminals of the stator sections of the linear motor structure serve as a common input terminal, and another terminal serves as a common ground terminal; and the rotor of the linear motor structure is configured to receive at least one of the vehicle inductive power generation power information and the train communication signal.

29. The system device according to claim 17, further comprising: an independent transformer component for power generation and/or communication, wherein the independent transformer component for power generation and/or communication is configured to perform independent transformation on at least one of the vehicle inductive power generation power information and the train communication signal both of which are in the two-single manner; and input the transformed at least one of vehicle inductive power generation power information and the train communication signal to the stator sections of the linear motor structure, wherein two of three-phase terminals of the stator sections of the linear motor structure serve as a common input terminal, and another terminal serves as a common ground terminal; and the rotor of the linear motor structure is configured to receive at least one of the vehicle inductive power generation power information and the train communication signal.

30. The system device according to claim 17, further comprising: an independent primary winding transformer component, wherein the independent primary winding transformer component is configured to perform independent primary winding transformation on at least one of the vehicle inductive power generation power information and the train communication signal both of which are in the two-single manner;

the independent primary winding transformer component is further configured to input the transformed at least one of the vehicle inductive power generation power information and the train communication signal to the stator sections of the linear motor structure, wherein two of three-phase terminals of the stator sections of the linear motor structure serve as a common input terminal, and another terminal serves as a common ground terminal; and the rotor of the linear motor structure is configured to receive at least one of the vehicle inductive power generation power information and the train communication signal.

31. The system device according to claim 17, further comprising: an independent transformer component for power generation and/or communication, wherein power generation output converter components and/or communication converter components in the two-single phase are connected in series, to input in series at least one of the vehicle inductive power generation power information and the train communication signal in a two-single phase;

the power generation output converter components and/or the communication converter components are configured to input at least one of the vehicle inductive power generation power information and the train communication signal obtained by inputting in series directly to two of the three-phase terminals of the stator sections of the linear motor structure; or, the independent transformer component for power generation and/or communication is configured to perform transformation on at least one of the vehicle inductive power generation power information and the train communication signal obtained by inputting in series;

the independent transformer component for power generation and/or communication is further configured to connect the transformed at least one of the vehicle inductive power generation power information and the train communication signal to two of three-phase terminals of the stator sections of the linear motor; and the rotor of the linear motor structure is configured to receive at least one of the vehicle inductive power generation power information and the train communication signal.

32. The system device according to claim 17, further comprising: an integrated traction and power generation converter component, an integrated traction and communication converter component, and an integrated traction, power generation and communication converter component, wherein the integrated traction and power generation converter component comprises functions of the traction converter component and the power generation output converter component;

the integrated traction and communication converter component comprises functions of the traction converter component and the communication converter component;

the integrated traction, power generation and communication converter component comprises functions of the traction converter component, the power generation output converter component and the communication converter component;

the integrated traction and power generation converter component is configured to combine the linear motor traction power information with the vehicle inductive power generation power information to obtain a first combined information, wherein the first combined information is transmitted through the stator sections of the linear motor structure, and is received through the rotor of the linear motor structure;

the integrated traction and communication converter component is configured to combine the linear motor traction power information with the train communication signal to obtain a second combined information, wherein the second combined information is transmitted through the stator sections of the linear motor structure, and is received through the rotor of the linear motor structure; or, the integrated traction, power generation and communication converter component is configured to combine the linear motor traction power information, the vehicle inductive power generation power information, and the train communication signal to obtain a third combined information, wherein the third combined information is transmitted through the stator sections of the linear motor structure, and is received through the rotor of the linear motor structure.

33. The system device according to claim 32, further comprising: an independent transformer component, wherein the independent transformer component is configured to perform independent transformation on the first combined information, wherein the transformed first combined information is transmitted through the stator sections of the linear motor structure;

the independent transformer component is configured to perform independent transformation on the second combined information, wherein the transformed second combined information is transmitted through the stator sections of the linear motor structure; or the independent transformer component is configured to perform independent transformation on the third combined information, wherein the transformed third combined information is transmitted through the stator sections of the linear motor structure.

34. The system device according to claim 17, wherein the system device further comprises:

a first band-pass filter, configured to perform first band-pass filtering on the linear motor traction power information and the other linear motor carried information, to pass the linear motor traction power information and signals related to braking and traction control to be passed;

a second band-pass filter, configured to perform second band-pass filtering on the linear motor traction power information and the other linear motor carried information, to pass the train inductive power generation power information and signals related to power generation control to be passed; and a third band-pass filter, configured to perform third band-pass filtering on the linear motor traction power information and the other linear motor carried information, to pass the train communication signal and signals related to train control.

35. The system device according to claim 16, wherein, the rotor of the linear motor structure comprises a linear motor rotor and a vehicle inductive power generation coil;

the vehicle inductive power generation coil is configured to generate power generation power by coupling with the vehicle inductive power generation power information of the stator sections of the linear motor structure, the vehicle inductive power generation coil is further configured to: couple with the train communication signal of the stator sections of the linear motor structure and transmit the coupled signal to a signal demodulator, to demodulate the coupled signal by the signal demodulator to obtain the train communication signal; and the vehicle inductive power generation coil is further configured to transmit an in-vehicle signal to the stator sections, and the vehicle inductive power generation coil is further configured to transmit the in-vehicle signal to the stator sections of the linear motor structure.

36. The system device according to claim 16, further comprising: a communication transceiver coil, wherein the rotor of the linear motor structure comprises a linear motor rotor and a vehicle inductive power generation coil;

the vehicle inductive power generation coil is configured to generate power generation power by coupling with the vehicle inductive power generation power information of the stator sections of the linear motor structure;

the communication transceiver coil is configured to: couple with the train communication signal of the stator sections of the linear motor structure and transmit the coupled signal to a signal demodulator, to demodulate the coupled signal by the signal demodulator to obtain the train communication signal;

the communication transceiver coil is further configured to transmit an in-vehicle signal to the stator sections of the linear motor structure, and wherein in a case that the communication channel is a single channel, the communication transceiver coil is connected to two of three-phase terminals of the signal demodulator; and in a case that the communication channel is a two-channel, two of the three-phase terminals of the signal demodulator each serves as a positive terminal of a single communication transceiver coil, and another terminal serves as a common ground terminal.

37. The system device according to claim 36, wherein the communication transceiver coil is arranged on the magnetic levitation train, and is connected to a train control network.

38. The system device according to claim 37, wherein the communication transceiver coil is arranged on a same vehicle as an in-vehicle operation control host and a train microwave communication antenna; or the communication transceiver coil is arranged on the rotor of the linear motor, a magnetic levitation frame or a body of the magnetic levitation train.

39. The system device according to claim 16, further comprising a charging pile, wherein the charging pile is connected with a body of the magnetic levitation train through a cable; and the magnetic levitation train is charged by using the charging pile in a case that that magnetic levitation train is stopped at a station or is maintained.

40. The system device according to claim 16, wherein the linear motor structure comprises a unilateral linear motor, a bilateral linear motor, and a multilateral linear motor in type; and the rotor of the linear motor structure comprises a permanent magnet rotor, an electric excitation rotor and a permanent magnet-electric excitation hybrid rotor in magnetic type.

\* \* \* \* \*